(12) United States Patent
Denoual et al.

(10) Patent No.: US 10,104,138 B2
(45) Date of Patent: Oct. 16, 2018

(54) METHOD, DEVICE, AND COMPUTER PROGRAM FOR ENCODING INTER-LAYER DEPENDENCIES IN ENCAPSULATING MULTI-LAYER PARTITIONED TIMED MEDIA DATA

(71) Applicant: CANON KABUSHIKI KAISHA, Tokyo (JP)

(72) Inventors: Franck Denoual, Saint Domineuc (FR); Frédéric Maze, Langan (FR); Cyril Concolato, Combs la Ville (FR); Jean Le Feuvre, Cachan (FR)

(73) Assignee: Canon Kabushiki Kaisha, Tokyo (JP)

(*) Notice: Subject to any disclaimer, the term of this patent is extended or adjusted under 35 U.S.C. 154(b) by 280 days.

(21) Appl. No.: 15/109,798

(22) PCT Filed: Jan. 7, 2015

(86) PCT No.: PCT/EP2015/050183
§ 371 (c)(1),
(2) Date: Jul. 5, 2016

(87) PCT Pub. No.: WO2015/104303
PCT Pub. Date: Jul. 16, 2015

(65) Prior Publication Data
US 2016/0330255 A1 Nov. 10, 2016

(30) Foreign Application Priority Data

Jan. 7, 2014 (GB) .................................. 1400244.8
Jan. 8, 2014 (GB) .................................. 1400303.2

(51) Int. Cl.
*H04N 7/12* (2006.01)
*H04N 11/02* (2006.01)
(Continued)

(52) U.S. Cl.
CPC ........ *H04L 65/4069* (2013.01); *H04L 65/608* (2013.01); *H04N 19/115* (2014.11); *H04N 19/186* (2014.11); *H04N 19/30* (2014.11)

(58) Field of Classification Search
None
See application file for complete search history.

(56) References Cited

U.S. PATENT DOCUMENTS

2012/0230431 A1   9/2012   Boyce

OTHER PUBLICATIONS

Le Feuvre et al., "Inputs to WD of 14496-15 AMD2", 106. MPEG Meeting, Oct. 28, 2013-Nov. 1, 2013, Geneva, (Motion Picture Expert Group or ISO/I EC JTC1/SC29/WG11), No. m31439, Oct. 23, 2013 (Oct. 23, 2013), XP030059891, figures 1,2, Sections 2 .1.1 and 2.1.4.

(Continued)

*Primary Examiner* — Chikaodili E Anyikire
(74) *Attorney, Agent, or Firm* — Canon USA, Inc. I.P. Division

(57) ABSTRACT

Multi-layer partitioned timed media data comprising timed samples is encapsulated. Each timed sample is encoded into a first layer and at least one second layer, at least one timed sample comprising at least one subsample, each subsample being encoded into the first layer or the at least one second layer. The method includes obtaining at least one subsample, belonging to said first layer, from at least one of the timed samples; creating a first track comprising the at least one obtained subsample; obtaining at least another subsample, belonging to said second layer, from the same one of the timed samples; creating a second track comprising said at least another obtained subsample; and generating descriptive metadata associated with the second track.

25 Claims, 19 Drawing Sheets

(51) Int. Cl.
 *H04N 11/04* (2006.01)
 *H04L 29/06* (2006.01)
 *H04N 19/30* (2014.01)
 *H04N 19/115* (2014.01)
 *H04N 19/186* (2014.01)

(56) References Cited

OTHER PUBLICATIONS

Maze et al., "Report on the spatial relationship description core experiment", 106. MPEG Meeting, Oct. 28, 2013-Nov. 1, 2013, Geneva, (Motion Picture Expert Group or ISO/I EC JTC1/SC29/WG11), No. m31603, Oct. 28, 2013 (Oct. 28, 2013), XP030060055, Section 2.1. Initial proposal after MPEG #105.

ISO/IEC: "Information technology—Coding of audio-visual objects—Part 15:Carriage of NAL unit structured video in the ISO Base Media File Format", ISO/IEC 14496-15:2013(E), vol. 2013, No. ISO/IEC 14496-15:2013(E), m31213, Oct. 24, 2013 (Oct. 24, 2013), pp. 1-134, XP030059666, Sections 4,6,8.

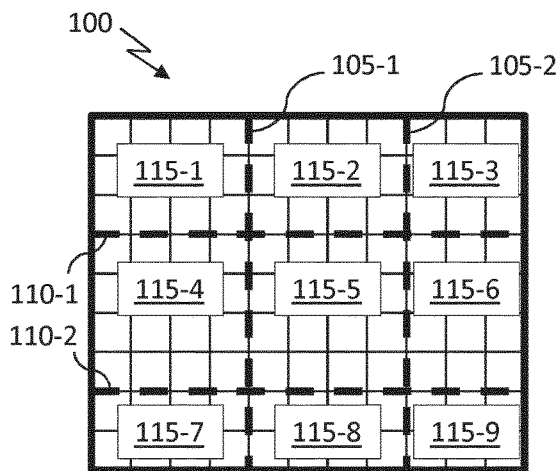
Fig. 1a
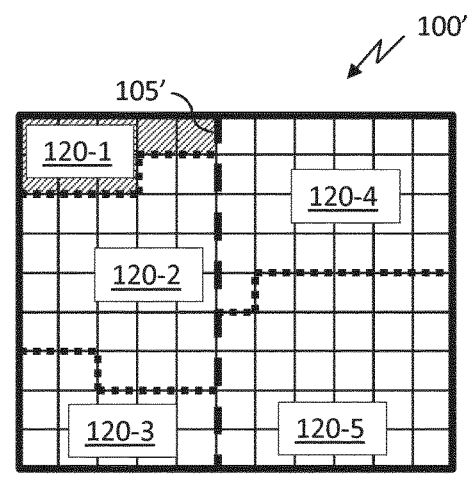
Fig. 1b
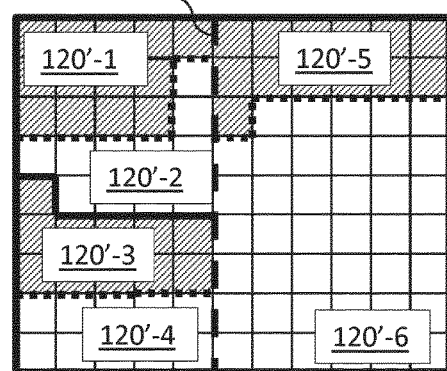
Fig. 1c
| Tile 1 | Tile 2 |
| --- | --- |
| Tile 3 | Tile 4 |
Fig. 2a

800

```
class TileRegionGroupEntry() extends VisualSampleGroupEntry ('trif')
{
  unsigned int(16) groupID;
  unsigned int(2)  independent;
  unsigned int(1)  full_frame;
  unsigned int(5)  reserved=0;
  if (!full_frame) {
   unsigned int(16) horizontal_offset;
   unsigned int(16) vertical_offset;
  }
  unsigned int(16) region_width;
  unsigned int(16) region_height;}
```

```
class TileSetGroupEntry() extends VisualSampleGroupEntry ('tsif') {
  unsigned int(16) groupID;
  int(1) area_description;
  int(2) dependency_list;
  int (5) reserved;
  if (area_description==0) {
    unsigned int(16) tile_count;
    for (i=1; i<= tile_count; i++){
      unsigned int(16) tileGroupID;
    }
  } else {
    unsigned int(16) topLeftTileGroupId;
    unsigned int(16) bottomRightTileGroupId;
  }
  if (dependency_list==1) {
    unsigned int(16) dependency_tile_count;
    for (i=1; i<= dependency_tile_count; i++){
      unsigned int(16) dependencyTileGroupID;
    }
  } else if (dependency_list==2) {
    unsigned int(16) topLeftDependencyTileGroupId;
    unsigned int(16) bottomRightDependencyTileGroupId;
  }
}
```

```
                              900
class TileSetGroupEntry() extends VisualSampleGroupEntry ('tsif') {
  unsigned int(16) groupID;
  int(1) area_description;        904
  int(3) dependency_list;
  int (4) reserved;
  if (area_description==0) {
    unsigned int(16) tile_count;
    for (i=1; i<= tile_count; i++){
      unsigned int(16) tileGroupID;
    }
  } else {
    unsigned int(16) topLeftTileGroupId;
    unsigned int(16) bottomRightTileGroupId;
  }
                              901        902
  if (dependency_list > 0) {          // dependencies are signalled
    if ( dependency_list &1) == 1) {    // Intra-layer dependencies
      if (dependency_list&4 == 0) { // expressed as a list
        unsigned int(16) dependency_tile_count;
        for (i=1; i<= dependency_tile_count; i++){
          unsigned int(16) dependencyTileGroupID;
        }
      } else { // area
        unsigned int(16) topLeftDependencyTileGroupId;
        unsigned int(16) bottomRightDependencyTileGroupId;
      }
    }                         903
    if (dependency_list&2 == 1) {   // Inter-layer dependencies
      if (dependency_list&4 == 0) { // expressed as a list
        unsigned int(16) dependency_tile_count;
        for (i=1; i<= dependency_tile_count; i++){
          unsigned int(16) dependencyTileGroupID;
        }
      } else { // area
        unsigned int(16) topLeftDependencyTileGroupId;
        unsigned int(16) bottomRightDependencyTileGroupId;
      }
    }
  }
}
```

Fig. 9

METHOD, DEVICE, AND COMPUTER PROGRAM FOR ENCODING INTER-LAYER DEPENDENCIES IN ENCAPSULATING MULTI-LAYER PARTITIONED TIMED MEDIA DATA

CROSS-REFERENCE TO RELATED APPLICATIONS

The application is the National Phase application of PCT Application No. PCT/EP2015/050183, filed on Jan. 07, 2015 and which claims the benefit under 35 U.S.C. § 119(a)-(d) of United Kingdom Patent Application No. 1400244.8, filed on Jan. 07, 2014 and of United Kingdom Patent Application No. 1400303.2, filed on Jan. 08, 2014. The above cited patent applications are incorporated herein by reference in their entirety.

FIELD OF THE INVENTION

The invention generally relates to the field of encapsulation of timed media data, e.g. according to Base Media File Format as defined by the MPEG standardization organization, to provide a flexible and extensible format that facilitates interchange, management, editing, and presentation of the media data and to improve stream delivery, in particular regarding HTTP (HyperText Transfer Protocol) and RTP (Real-time Transport Protocol) streaming of user-selected regions of interest in compressed video streams. More particularly, the invention concerns a method, device, and computer program for encoding inter-layer dependencies in encapsulating an elementary stream containing multi-layer partitioned data such as spatial tiles allowing efficient streaming or extraction of data, in particular of one or more tiles.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits. Video streaming mechanisms are widely deployed and used over the Internet network and mobile networks to stream audio/video media over HTTP (HyperText Transfer Protocol) such as 3GPP's Adaptive HTTP Streaming (AHS), Microsoft's Smooth Streaming or Apple's HTTP live streaming for instance.

Recently, the Moving Picture Experts Group (MPEG) published a new standard to unify and supersede existing streaming solutions over HTTP. This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" which represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges. Based on a manifest, a client device determines at any time which media segments are to be downloaded from a media data server according to its needs, its capabilities (e.g. supported codecs, display size, frame rate, level of quality, etc.), and depending on network conditions (e.g. available bandwidth).

It is to be noted that there exist alternative protocols to HTTP, for example the Real-time Transport Protocol (RTP).

In addition, video resolution is continuously increasing, going from standard definition (SD) to high definition (HD), and to ultra-high definition (e.g. 4K2K or 8K4K, that is to say video comprising images of 4,096×2,400 pixels or 7,680×4,320 pixels). However, not all receiving and video decoding devices have resources (e.g. network access bandwidth or CPU (Central Processing Unit)) to access video in full resolution, in particular when video is of ultra-high definition, and not all users need to access such video. In such a context, it is particularly advantageous to provide the ability of accessing only some Regions-of-Interest (ROIs) that is to say to access only some spatial sub-parts of a whole video sequence.

A known mechanism to access spatial sub-parts of frames belonging to a video consists in organizing each frame of the video as an arrangement of independently decodable spatial areas generally referred to as tiles. Some video formats such as SVC (Scalable Video Coding) or HEVC (High Efficiency Video Coding) provide support for tile definition. A user-defined ROI may cover one or several contiguous tiles.

Accordingly, for streaming user-selected ROIs according to HTTP protocol, it is important to provide encapsulation of timed media data of an encoded video bit-stream in a way that enables spatial access to one or more tiles and that enables combination of accessed tiles.

It is to be recalled that encoded video bit-streams are generally constructed as a set of contiguous temporal samples that correspond to complete frames, the temporal samples being organized as a function of the decoding order. File formats are used to encapsulate and describe such encoded bit-streams.

For the sake of illustration, the International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters. According to this file format, the timed media data bit-stream is contained in a data structure referred to as mdat box that is defined in another data structure referred to as track box. The track represents a timed sequence of samples where a sample corresponds to all the data associated with a single timestamp that is to say all the data associated with a single frame or all the data associated with several frames sharing the same timestamp.

For scalable video such as video of the SVC format, the layered media data organization can be efficiently represented by using multiple dependent tracks, each track representing the video at a particular level of scalability. In order to avoid data duplication between tracks, extractors can be used. According to a standard file format, an extractor is a data structure directly included in a bit-stream that enables efficient extraction of network abstraction layer (NAL) units from other bit-streams. For instance, the bit-stream of an enhancement layer track may comprise extractors that reference NAL units from a base layer track. Then later on, when such enhancement layer track is extracted from the file format, extractors must be replaced by the data that they are referencing.

Several strategies can be adopted when using ISO BMFF embedding these mechanisms to describe sub-information and to ease access to this sub-information or to efficiently organize bit-streams into multiple segments.

For example, in the article entitled "Implications of the ISO Base Media File Format on Adaptive HTTP Streaming of H.264/SVC", the authors, Kofler et al., present three different strategies for organizing a scalable video bit-stream (H264/SVC) for HTTP streaming considering possibilities as well as limitations of the ISO BMFF:

a) a single file containing a particular file header comprising a file type box "ftyp" and a movie box "moov" containing all ISO BMFF metadata (including track definitions), the single file also comprising a single mdat box containing the whole encoded bit-stream. This organization is suitable for local storage but is not adapted to HTTP streaming where a client may only need a part of the whole bit-stream;

b) a single file containing multiple moof/mdat boxes suitable for fragmentation. This format allows for progressive download. The moof box is equivalent to the moov box at fragment level. According to this scheme, using a fragmented media file, the scalable bit-stream is split into multiple dependent tracks representing the video at different scalability levels. Extractors are used to reference NAL units from other tracks. In case a track per tile is used, all addressable tracks have to be prepared in advance and tracks cannot be selected independently. If several tiles are to be displayed, several bit-streams must be decoded and the base layer is decoded several times;

c) multiple segments files, each file being accessible by its own URL and being downloadable independently. Each segment typically consists of a segment type box (styp), which acts as a kind of file header, an optional segment index box (sidx) and one or multiple fragments. Again, each fragment consists of a moof and a mdat box. According to this scheme, using a fragmented media file, each track is stored in its own segment with the associated bit-stream related to one level of scalability. If necessary, extractors are used to reference required bit-stream from dependent tracks. Such a coding scheme is particularly suitable for streaming tracks independently. It is well adapted to the DASH standard but it is not suitable for tile streaming since several bit-streams are to be decoded and thus, one decoder per track is required. Moreover, there is a potential duplication of the base layer's bit-stream when selecting more than one tile.

When applied to spatial tiles, none of these strategies allows efficient access to specific tiles in the context of HTTP streaming. Indeed with existing file format definition, it would still be necessary to access a multiple number of non-continuous byte ranges in an encoded bit-stream or it would result in bit-stream duplication in order to display spatial tiles of several frames corresponding to a given time interval.

To solve these issues, there is provided an efficient data organization and track description scheme suitable for handling spatial tiles in multi-layer video streams, which ensures, whatever track combination is selected by a client application, that the result of the ISO BMFF parsing always leads to a valid video elementary bit-stream for the video decoder, requiring a low description overhead.

SUMMARY OF THE INVENTION

According to a first group of aspects of the present invention there is provided a method for encapsulating multi-layer partitioned timed media data in a server as defined by claim 1, a method for decapsulating (or parsing) multi-layer partitioned timed media data in a client device as defined by claim 8, a computer-readable storage medium storing the encapsulating program and/or the decapsulating (or parsing) program as defined by claim 16, a device for encapsulating multi-layer partitioned timed media data as defined by claim 17, a device for decapsulating (or parsing) multi-layer partitioned timed media data as defined by claim 24, a media segment file comprising at least part of the multi-layer partitioned timed media data encapsulated by the encapsulating method as defined by claim 31, and a computer-readable storage medium storing the media segment file as defined by claim 32.

According to a first object of a second group of aspects of the present invention there is provided a method for encapsulating multi-layer partitioned timed media data, the multi-layer partitioned timed media data comprising timed samples, each timed sample being encoded into a first layer and at least one second layer, at least one timed sample comprising at least one subsample, each subsample being encoded into the first layer or the at least one second layer, the method comprising:

obtaining at least one subsample from at least one of the timed samples;

creating a track comprising the at least one obtained subsample; and generating descriptive metadata associated with the created track, the descriptive metadata comprising a descriptor for signaling a dependency link between the at least one obtained subsample and at least another subsample, the dependency link in one description mode being made up of a first dependency list describing one or more first dependencies between the at least one obtained subsample and another subsample; and a second dependency list, separate from the first dependency list, describing one or more second dependencies between the at least one obtained subsample and another subsample.

According to embodiments, the or each said first dependency is an intra-layer dependency and the or each said second dependency is an inter-layer dependency.

According to embodiments, the first dependency list excludes inter-layer dependencies and the second dependency list includes inter-layer dependencies.

According to embodiments, each said dependency list comprises a count of the number of said dependencies described therein.

According to embodiments, the descriptor further comprises a parameter which is set to a specific value to indicate that said one description mode is used.

According to embodiments, in a further description mode, the dependency link is made up of a single dependency list describing the dependencies between the at least one obtained subsample and each other subsample.

According to embodiments, the descriptor further comprises a parameter which is set to a first specific value to indicate that said one description mode is used and which is set a second specific value to indicate that said further description mode is used.

According to embodiments, in yet another description mode, the dependency link has no such dependency list and the dependencies between the at least one obtained subsample and other subsamples are defined as a reference area.

According to embodiments, the descriptor further comprises a parameter which is set to a first specific value to indicate that said one description mode is used and which is set a second specific value to indicate that said further description mode is used and which is set to a third specific value to indicate that said yet another description mode is used.

According to embodiments, the descriptor is a TileSetGroupEntry descriptor.

According to embodiments, the method comprises including among the timed samples random access samples at respective random access points to generate regular inter-layer prediction patterns, and specifying in said second dependency list each dependency between said at least one obtained subsample and another subsample for such a random access sample.

According to embodiments, the method comprises specifying in said first dependency list each dependency between said at least one obtained subsample and another subsample for a sample other than such a random access sample.

According to embodiments, when the descriptor is a TileSetGroupEntry descriptor, the method comprises mapping all the timed samples using default sample grouping to said TileSetGroupEntry descriptor.

According to a second object of the second group of aspects of the present invention there is provided a method for parsing encapsulated multi-layer partitioned timed media data, the multi-layer partitioned timed media data comprising timed samples, each timed sample being encoded into a first layer and at least one second layer, at least one timed sample comprising at least one subsample, each subsample being encoded into the first layer or the at least one second layer, and the media data being encapsulated such that a track comprises at least one subsample obtained from at least one of the timed samples and descriptive metadata, associated with the track, comprises a descriptor for signaling a dependency link between the at least one obtained subsample and at least another subsample, the dependency link in one description mode being made up of a first dependency list describing one or more first dependencies between the at least one obtained subsample and another subsample and a second dependency list, separate from the first dependency list, describing one or more second dependencies between the at least one obtained subsample and another subsample, the method comprising obtaining the descriptor of the encapsulated media data and employing the descriptor to identify for a desired subsample the or each other subsample on which the desired subsample depends.

According to embodiments, the or each said first dependency is an intra-layer dependency and the or each said second dependency is an inter-layer dependency.

According to embodiments, the first dependency list excludes inter-layer dependencies and the second dependency list includes inter-layer dependencies.

According to embodiments, each said dependency list comprises a count of the number of said dependencies described therein.

According to embodiments, the descriptor further comprises a parameter which is set to a specific value to indicate that said one description mode is used.

According to embodiments, in a further description mode, the dependency link is made up of a single dependency list describing the dependencies between the at least one obtained subsample and each other subsample.

According to embodiments, the descriptor further comprises a parameter which is set to a first specific value to indicate that said one description mode is used and which is set a second specific value to indicate that said further description mode is used.

According to embodiments, in yet another description mode, the dependency link has no such dependency list and the dependencies between the at least one obtained subsample and other subsamples are defined as a reference area.

According to embodiments, the descriptor further comprises a parameter which is set to a first specific value to indicate that said one description mode is used and which is set a second specific value to indicate that said further description mode is used and which is set to a third specific value to indicate that said yet another description mode is used.

According to embodiments, the descriptor is a TileSetGroupEntry descriptor.

According to embodiments, random access samples are included among the timed samples at respective random access points in the encapsulated media data to generate regular inter-layer prediction patterns, the method comprising employing said second dependency list to identify each dependency between said at least one obtained subsample and another subsample for such a random access sample.

According to embodiments, the method comprises employing said first dependency list to identify each dependency between said at least one obtained subsample and another subsample for a sample other than such a random access sample.

According to embodiments, when the descriptor is a TileSetGroupEntry, all the timed samples in the encapsulated media data are mapped using default sample grouping to said TileSetGroupEntry descriptor.

According to a third and a fourth objects of the second group of aspects of the present invention there is provided a program which, when executed by a computer or processor, causes the computer or processor to carry out the method described above and a computer-readable storage medium storing this program.

According to a fifth object of the second group of aspects of the present invention there is provided a device for encapsulating multi-layer partitioned timed media data, the multi-layer partitioned timed media data comprising timed samples, each timed sample being encoded into a first layer and at least one second layer, at least one timed sample comprising at east one subsample, each subsample being encoded into the first layer or the at least one second layer, the device comprising:

means for obtaining at least one subsample from at least one of the timed samples;

means for creating a track comprising the at least one obtained subsample; and means for generating descriptive metadata associated with the created track, the descriptive metadata comprising a descriptor for signaling a dependency link between the at least one obtained subsample and at least another subsample, the dependency link in one description mode being made up of:

a first dependency list describing one or more first dependencies between the at least one obtained subsample and another subsample; and a second dependency list, separate from the first dependency list, describing one or more second dependencies between the at least one obtained subsample and another subsample.

According to embodiments, the or each said first dependency is an intra-layer dependency and the or each said second dependency is an inter-layer dependency.

According to embodiments, the first dependency list excludes inter-layer dependencies and the second dependency list includes inter-layer dependencies.

According to embodiments, each said dependency list comprises a count of the number of said dependencies described therein.

According to embodiments, the descriptor further comprises a parameter which is set to a specific value to indicate that said one description mode is used.

According to embodiments, in a further description mode, the dependency link is made up of a single dependency list describing the dependencies between the at least one obtained subsample and each other subsample.

According to embodiments, the descriptor further comprises a parameter which is set to a first specific value to indicate that said one description mode is used and which is set a second specific value to indicate that said further description mode is used.

According to embodiments, in yet another description mode, the dependency link has no such dependency list and the dependencies between the at least one obtained subsample and other subsamples are defined as a reference area.

According to embodiments, the descriptor further comprises a parameter which is set to a first specific value to indicate that said one description mode is used and which is set a second specific value to indicate that said further description mode is used and which is set to a third specific value to indicate that said yet another description mode is used.

According to embodiments, the descriptor is a TileSetGroupEntry descriptor.

According to embodiments, the device comprises means for including among the timed samples random access samples at respective random access points to generate regular inter-layer prediction patterns, and means for specifying in said second dependency list each dependency between said at least one obtained subsample and another subsample for such a random access sample.

According to embodiments, the device comprises means for specifying in said first dependency list each dependency between said at least one obtained subsample and another subsample for a sample other than such a random access sample.

According to embodiments, when the descriptor is a TileSetGroupEntry descriptor, the device comprises means for mapping all the timed samples using default sample grouping to said TileSetGroupEntry descriptor.

According to a sixth object of the second group of aspects of the present invention there is provided a device for parsing encapsulated multi-layer partitioned timed media data, the multi-layer partitioned timed media data comprising timed samples, each timed sample being encoded into a first layer and at least one second layer, at least one timed sample comprising at least one subsample, each subsample being encoded into the first layer or the at least one second layer, and the media data being encapsulated such that a track comprises at least one subsample obtained from at least one of the timed samples and descriptive metadata associated with the track, comprises a descriptor for signaling a dependency link between the at least one obtained subsample and at least another subsample, the dependency link in one description mode being made up of a first dependency list describing one or more first dependencies between the at least one obtained subsample and another subsample and a second dependency list, separate from the first dependency list, describing one or more second dependencies between the at least one obtained subsample and another subsample, the device comprising means for obtaining the descriptor of the encapsulated media data and means for employing the received descriptor to identify for a desired subsample the or each other subsample on which the desired subsample depends.

According to embodiments, the or each said first dependency is an intra-layer dependency and the or each said second dependency is an inter-layer dependency.

According to embodiments, the first dependency list excludes inter-layer dependencies and the second dependency list includes inter-layer dependencies.

According to embodiments, each said dependency list comprises a count of the number of said dependencies described therein.

According to embodiments, the descriptor further comprises a parameter which is set to a specific value to indicate that said one description mode is used.

According to embodiments, in a further description mode, the dependency link is made up of a single dependency list describing the dependencies between the at least one obtained subsample and each other subsample.

According to embodiments, the descriptor further comprises a parameter which is set to a first specific value to indicate that said one description mode is used and which is set a second specific value to indicate that said further description mode is used.

According to embodiments, in yet another description mode, the dependency link has no such dependency list and the dependencies between the at least one obtained subsample and other subsamples are defined as a reference area.

According to embodiments, the descriptor further comprises a parameter which is set to a first specific value to indicate that said one description mode is used and which is set a second specific value to indicate that said further description mode is used and which is set to a third specific value to indicate that said yet another description mode is used.

According to embodiments, the descriptor is a TileSetGroupEntry descriptor.

According to embodiments, random access samples are included among the timed samples at respective random access points in the encapsulated media data to generate regular inter-layer prediction patterns, the device comprising means for employing said second dependency list to identify each dependency between said at least one obtained subsample and another subsample for such a random access sample.

According to embodiments, the device comprises means for employing said first dependency list to identify each dependency between said at least one obtained subsample and another subsample for a sample other than such a random access sample.

According to embodiments, when the descriptor is a TileSetGroupEntry descriptor, all the timed samples in the encapsulated media data are mapped using default sample grouping to said TileSetGroupEntry descriptor.

According to a seventh, a eighth, and a ninth objects of the second group of aspects of the present invention there is provided a media segment file comprising at least part of the multi-layer partitioned timed media data encapsulated by the method described above, a computer-readable storage medium storing such a media segment file, and a signal carrying at least part of the multi-layer partitioned timed media data encapsulated by the method described above.

It is to be noted that a subsample of a layer can be linked to one or more subsamples of another layer or to several subsamples of different layers.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIGS. 1a, 1b, 1c, illustrate examples of tiles and slice segments in an HEVC bit-stream;

FIGS. 2a and 2b, illustrate an example of encapsulating tiles in multiple tracks;

FIGS. 8a and 8b, illustrate a single layer tile descriptor, modified according to a particular embodiment of the invention, and a tile set descriptor, respectively, enabling the description of decoding dependencies to other tiles;

FIG. 9 illustrates an example of a tile set descriptor for multi-layer tiling;

DETAILED DESCRIPTION OF EMBODIMENTS OF THE INVENTION

Figure 2B:
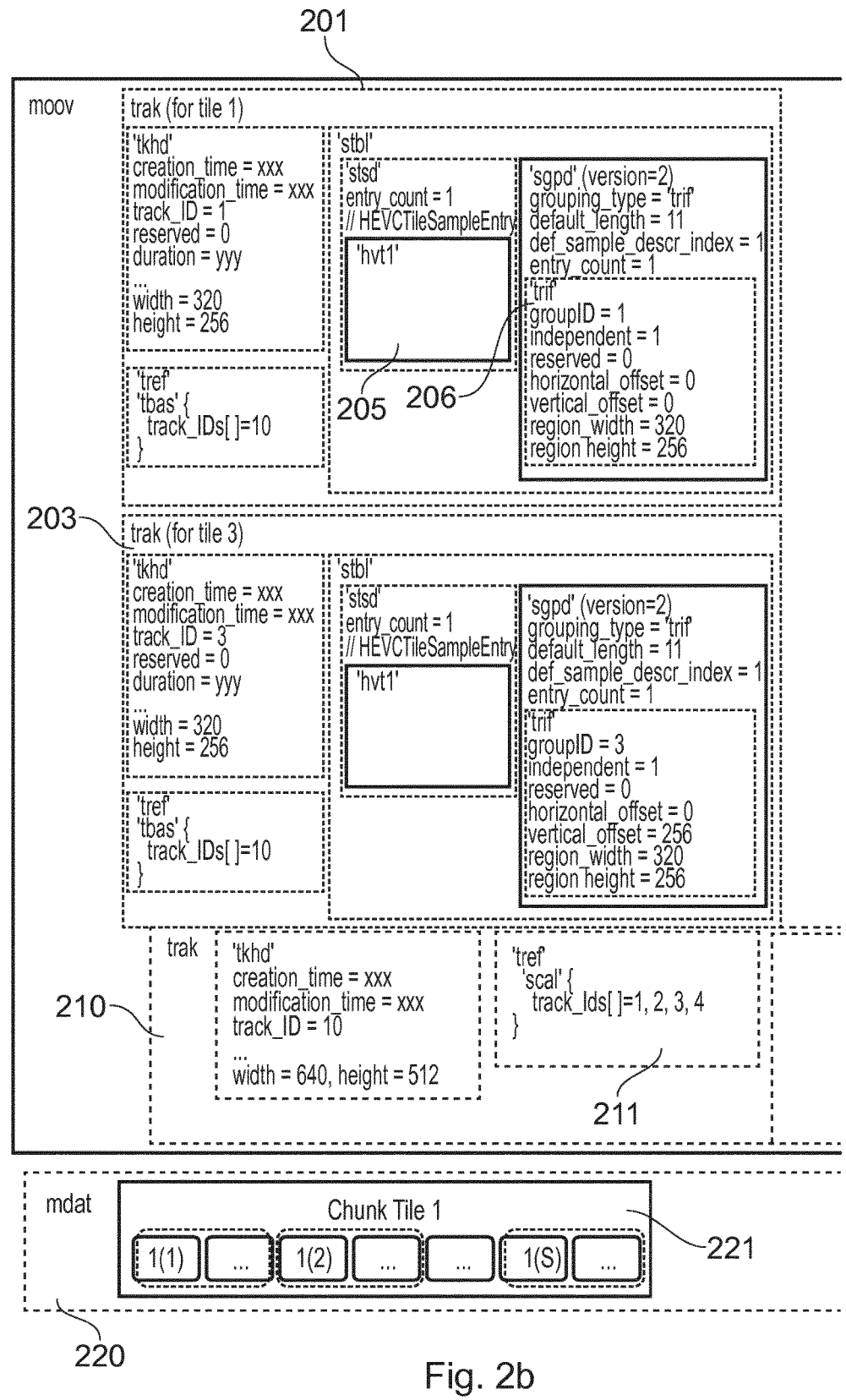

According to a particular embodiment, multi-layer partitioned timed media data such as multi-layer tiled timed media data (e.g. scalable tiled video data) comprising timed samples (e.g. images) are transmitted as a set of several timed media data tracks, typically base tracks and tile tracks. Still according to a particular embodiment, the base tracks comprise a base layer base track and at least one enhancement layer base track and the tile tracks comprise base layer tile tracks and enhancement layer tile tracks. Each timed media data track comprises one spatial subsample (e.g. several NAL units) of several timed samples. Extractors are used to describe track dependencies (tiling, inter-layer and/or intra-layer dependencies). Such a set of timed media data tracks allows the selecting, composing, and efficient streaming of multi-layer spatial video tiles. Each track can be transmitted from a server device to a client device as a set of media segment files. An initialization segment file can be used to transmit metadata required to decode media segment files.

Advantageously, tile descriptions are considered separately from layer dependency descriptions so that a change in dependencies, over time, does not require the entire tiling and dependencies to be described again. Inter-layer dependencies can be encoded using extractors, in particular recursive extractors, the recursion being controlled by the dependency declaration.

An embodiment of the invention can apply, for example, to the video format known as HEVC.

According to the HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTUs). Therefore, tiles can be efficiently used to identify regions of interest by defining, for example, positions and sizes for regions of interest. However, the structure of an HEVC bit-stream as well as its encapsulation as Network Abstract Layer (NAL) units are not organized in relation to tiles but are based on slices.

In the HEVC standard, slices are sets of slice segments, the first slice segment of a set of slice segments being an independent slice segment, that is to say a slice segment whose general information stored within a header does not refer to that of another slice segment. The other slice segments of the set of slice segments, if any, are dependent slice segments (i.e. slice segments whose general information stored within a header refers to that of an independent slice segment).

A slice segment contains an integer number of consecutive (in raster scan order) Coding Tree Units. Therefore, a slice segment can be of a rectangular shape or not and so, it is not suited to represent a region of interest. It is encoded in an HEVC bit-stream for a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bit-stream that are used to define tiles or as entropy decoding synchronization points.

FIG. 1, comprising FIGS. 1a, 1b, and 1c, illustrates examples of tiles and slice segments. More precisely, FIG. 1a illustrates an image (100) divided into nine portions by vertical boundaries 105-1 and 105-2 and horizontal boundaries 110-1 and 110-2. Each of the nine portions referenced 115-1 to 115-9 represents a particular tile.

FIG. 1b illustrates an image (100') containing two vertical tiles delimited by vertical boundary 105'. Image 100' comprises a single slice (not referenced) containing five slice segments, one independent slice segment 120-1 (represented with hatched lines) and four dependent slice segments 120-2 to 120-5.

FIG. 1c illustrates an image (100") containing two vertical tiles delimited by vertical boundary 105". The left tile comprises two slices: a first slice containing one independent slice segment (120'-1) and one dependent slice segment (120'-2) and a second slice also containing one independent slice segment (120'-3) and one dependent slice segment (120'-4). The right tile comprises one slice containing one independent slice segment (120'-5) and one dependent slice segment (120'-6).

According to the HEVC standard, slice segments are linked to tiles according to rules that may be summarized as follows (one or both conditions have to be met):
- all CTUs in a slice segment belong to the same tile (i.e. a slice segment cannot belong to several tiles); and
- all CTUs in a tile belong to the same slice segment (i.e. a tile may be divided into several slice segments provided that each of these slice segments only belongs to that tile).

For the sake of clarity, it is considered in the following that one tile contains one slice having only one independent slice segment. However, embodiments of the invention can be carried out with other configurations like the ones illustrated in FIGS. 1b and 1c.

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to the HEVC standard, the type of a NAL unit is encoded in two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <= RSV_IRAP_VCL23)
        no_output_of_prior_pics_flag
    slice_pic_parameter_set_id
    if(!first_slice_segment_in_pic_flag){
        if(dependent_slice_segments_enabled_flag)
            dependent_slice_segment_flag
        slice_segment_address
    }
    If(!dependent_slice_segment_flag){
    [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in the HEVC standard. It is set in slice segment headers with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

When a video bit-stream is encoded as a set of independent tiles, this then enables a tile-based decoding from one frame to another without any risk for missing reference data or propagation of reconstruction errors. This configuration then makes it possible to reconstruct only a spatial part of the original video that can correspond, for example, to the region of interest illustrated in FIG. 4 (comprising tiles 3 and 7). Such a configuration can be indicated as supplemental information in a video bit-stream so as to indicate that tile-based decoding is reliable.

An existing sample grouping mechanism of the MPEG-4 Part 12 standard can be used to encapsulate tiles. Accordingly, a specific sample group description is created with a tile descriptor that is a specific kind of the standard VisualSampleGroupEntry descriptor. Sample grouping mechanisms are used for representing partitions of samples in a track. They rely on the use of two boxes: a SampleToGroup box ('sbgp') that describes the assignment of samples to sample groups and a SampleGroupDescription box ('sgpd') that describes common properties of samples within a particular sample group. A particular type of sample grouping is defined by the combination of one SampleToGroup box and one SampleGroupDescription box via a type field (grouping type). Multiple sample grouping instances (i.e. pairs of SampleToGroup and SampleGroupDescription boxes) can exist based on different grouping criteria.

A particular grouping criterion related to the tiling of samples is used. This particular grouping type, called 'trif', describes the properties of a tile and is derived from the standard VisualSampleGroupEntry. It can be referred to as TileRegionSampleGroupEntry and is defined as follows:

```
class TileRegionGroupEntry ( ) extends VisualSampleGroupEntry ('trif') {
    unsigned int(16) groupID;
    unsigned int(2) independent;
    unsigned int(6) reserved=0;
    unsigned int(16) horizontal_offset;
    unsigned int(16) vertical_offset;
    unsigned int(16) region_width;
    unsigned int(16) region_height;
}
```

According to this particular type of group entry, parameter groupID is a unique identifier for the tile described by the group. Parameters horizontal offset and vertical offset are used to set an horizontal and a vertical offset, respectively, of the top-left pixel of the rectangular region represented by the tile, relative to the top-left pixel of the HEVC frame, in luma samples of the base region. Parameters region_width and region_height are used to set the width and height, respectively, of the rectangular region represented by the tile, in luma samples of the HEVC frame. Parameter independent is a 2-bit word that specifies that the tile comprises decoding dependencies relating to samples only belonging to the same tile, as described above by reference to the definition of independent tiles. For the sake of illustration and referring to a standard use of SEI messages (Supplemental Enhancement Information) for describing tile organization, the flag known as tile section exact match flag can be used to set the value of the independent flag whose meaning can be set as follows:

if parameter independent equals 0, the coding dependencies between this tile and other tiles in the same frame or previous frames is either described at the tile set level or unknown;
  if parameter independent equals 1, there are no temporal coding dependencies between this tile and the other tiles with different groupID in any reference frames but there can be coding dependencies between this tile and the tile with the same groupID in the reference frames, and
  if parameter independent equals 2, there are no coding dependencies between this tile and other tiles in the same frame, and no coding dependencies between this tile and any other tiles in the reference frames,
  the independent parameter value 3 being reserved.

Optionally, a parameter describing an average bitrate per tile can be set in the tile descriptor or in a mp4 box describing the tile sample entries, for example an HEVC-TileSampleEntry 205 that is a specific VisualSampleEntry, represented by 4 character code 'hvt1', with a MPEG4BitRateBox. It can be useful to store per-tile bitrate information in this box, so as to be provided to streaming client for an adaptation based on the bandwidth. As for most of mp4 boxes, the HEVCTileSampleEntty box can be extended with optional extra boxes to match application specific needs.

The properties of each tile are given once in the movie header ('moov' box) by defining, for each tile track, one SampleGroupDescription box ('sgpd') with the 'trif' grouping_type and a TileRegionGroupEntry. Tile properties can also be defined per track fragment. Such a mp4 track can be defined as a video tile track or tile track. According to the HEVC standard, an HEVC tile track is a video tile track for which there is a reference to an HEVC track carrying the other NALUs (typically set up information such as various parameter sets) of the HEVC layer to which the tile(s) in this track belong. The reference can use values already defined in the MPEG-4 Part 15 standard such as the 'sbas' four character code, or a more specific one such as 'tbas', to indicate tile base track.

One tile track shall either have one and only one TileRegionGroupEntry (illustrated in FIG. 8a) and no TileSetGroupEntry or one and only one TileSetGroupEntry and one or more dependent TileRegionGroupEntry from which this tile set is made, a TileSetGroupEntry being an extension of a TileRegionGroupEntry to described a set of tiles. It is to be noted that each of these groups is assigned a unique identifier, which can be used to associate a NALU to a group. Tile regions and tile sets share the same namespace for groupID, scoped by the base HEVC layer, as indicated by 'tbas' track reference (i.e. there shall not be two tile regions or tile sets with the same groupID in any tracks having the same base layer).

Figure 2B:
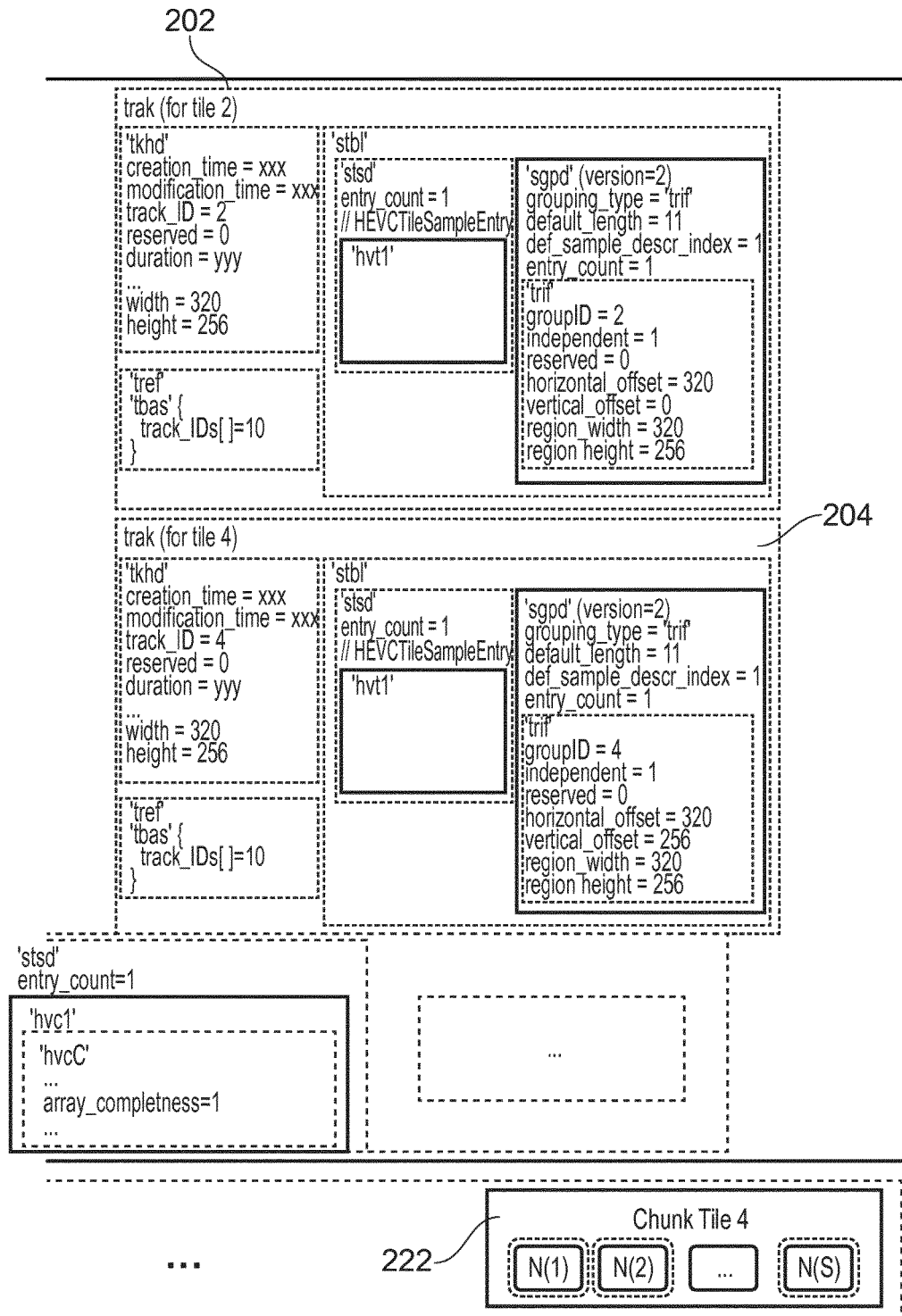

FIG. 2, comprising FIGS. 2a and 2b, illustrates an example of encapsulating tiles in multiple tracks.

FIG. 2a illustrates an example of tile configuration. For the sake of illustration, it comprises four tiles (tile 1 to tile 4), the size of each tile being of 310 pixel width and 256 pixel height.

FIG. 2b illustrates an example of encapsulating the four tiles represented in FIG. 2a into independent tracks according to the MPEG-4 file format. As illustrated, each tile is encapsulated in its own track, enabling efficient data addressing and leading to encapsulating the video as 5 tracks: four tile tracks referenced 201, 202, 203, and 204 for encapsulating each tile and one parameter set track 210 (also referred to as base track in the description) common to all tile tracks.

The description of each tile track (201, 202, 203, and 204) is based on a TileRegionGroupEntry box (identified by the 'trif' reference), such as TileRegionGroupEntry box 206.

Here, the 'trif' boxes use the default sample grouping mechanism (with attribute default_sample_description_index=1, noted def_sample_descr_index=1 in the Figure) to associate all the samples of the tile track to the appropriate TileRegionGroupEntry or TileSetGroupEntry. For example, the NAL units 221 corresponding to tile 1 are described in track 1 (referenced 201) in the TileRegionGroupEntry box 206.

There is no need here for a NALUMapEntry descriptor since all samples in a given track map to the tile described by this track. References 221 and 222 designate, respectively, data chunks that contain data for tile 1 and tile 4 from time 1 to time S (duration of the media file or media segment in case of track fragments).

Actually the track samples are not conventional video samples since in this embodiment, they are tile samples: a sample stored in a tile track is a complete set of slices for one or more tiles, as defined in ISO/IEC 23008-2 (HEVC). This excludes parameter sets, SEI messages, and other non-VOL NAL units. An HEVC sample stored in a tile track is considered as a sync sample if the VCL NAL units in the sample indicate that the coded slices contained in the sample are Instantaneous Decoding Refresh (IDR) slices, Clean Random Access (CRA) slices, or Broken Link Access (BLA) slices. As such, they do not have the same sizes as conventional samples would have: according to the example of FIG. 2a, conventional HEVC samples would have a size of 640×512 pixels while here, the HEVC samples stored in each tile track have a size of 320×256 pixels. In order to avoid ambiguity at parsing time, the tile samples are signaled with a new type of VisualSampleEntry descriptor: the HEVCTileSampleEntry descriptor, such as HEVCTileSampleEntry descriptor 205 associated with track 1 (designated with 4-letter code 'hvt1').

Formally, the sample entries of HEVC video tracks are HEVCSampleEntries declared in the sample description box of each track header. Here, since multiple tracks representing the same video stream are used, each tile track comprises an indication that the samples in the track are actually samples of a sub part of a complete video stream, indicating that these samples are samples of the HEVCTileSampleEntry type (each 'htv1' box in the Sample Description box 'stsd' of each track). Then, the decoding of a tile track does not involve any layout operation, and the tile is decoded at the same place in the video decoder memory as if all tiles were decoded. Then the layout information in the track header of a tile track are set identical to the track header information of the associated base track as identified by the 'tbas' track reference type. Otherwise, the tile track should be ignored. Additionally, visual information in a tile track does not differ from the visual information in its related base track. In particular, there is no need to redefine information like clean aperture box 'clap' or pixel sample aspect ratio 'pasp' in the sample description.

For the sample description type 'hvt1', neither the samples in the tile track or the sample description box can contain PS, SPS or PPS NAL units. These NAL units must be in the samples or in the sample description box of the track containing the base layer (as identified by the track references) in case of scalability or in a dedicated track such as dedicated track 210 in FIG. 2b.

Sub-sample and sample grouping defined for regular HEVC samples have the same definitions for an HEVC tile sample. The dependencies between the parameter set/base track 210 and the tile tracks are preferably described using a track reference box "tref" of type 'scal' referenced 211 (or any other four-byte code signaling an extractor-based tiling dependency).

HEVC video coding standard supports multi-layer video encoding for multi-view or scalable applications. In this case, a given layer can be used as reference data for one or more other layers.

Figure 3A:
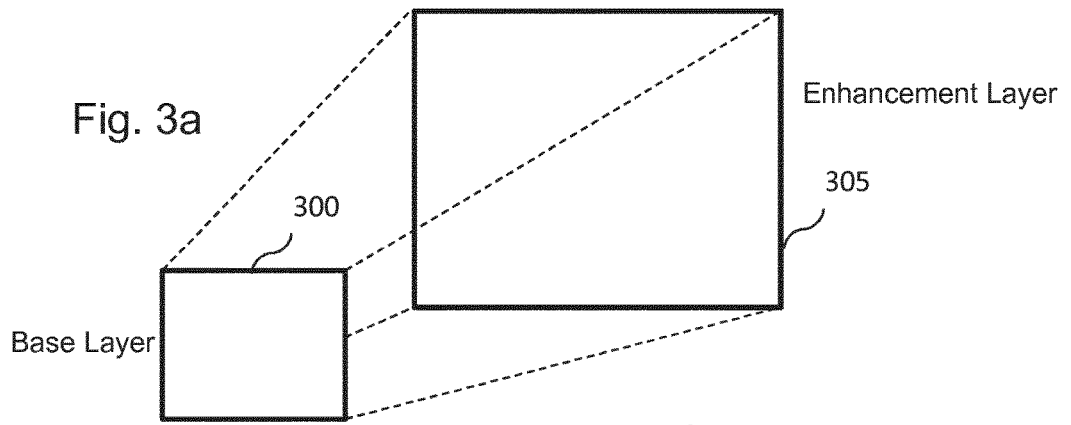
FIGS. 3a, 3b, and 3c, illustrate different examples of configurations of HEVC scalable bit-streams.
Figure 3B:
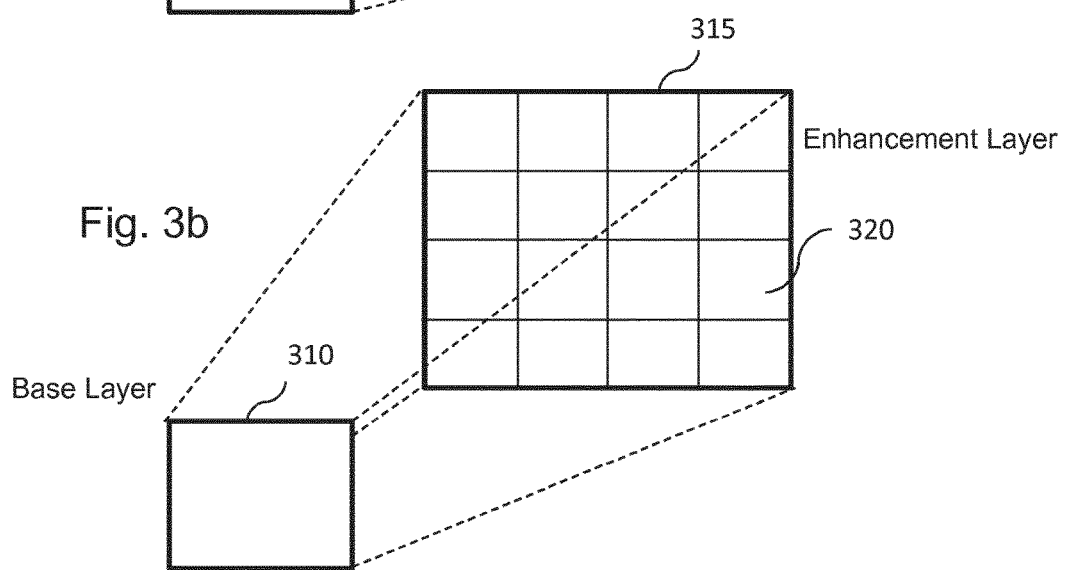
Figure 3C:
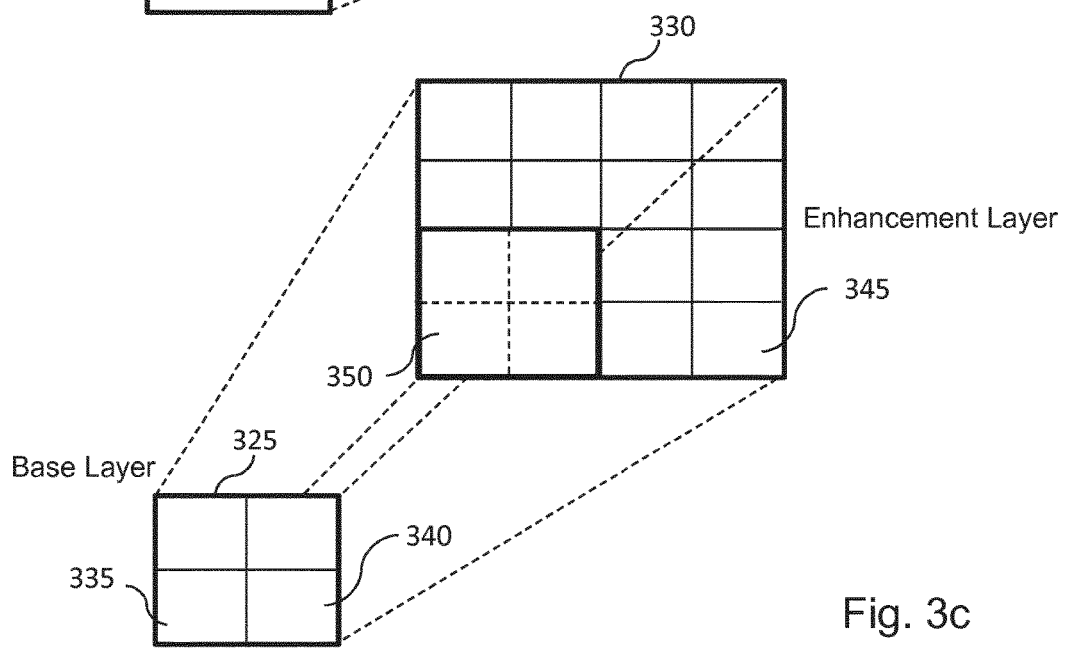

FIG. 3, comprising FIGS. 3a, 3b, and 3c, illustrates different examples of configurations of HEVC scalable bit-streams.

FIG. 3a is an example of a spatially scalable video bit-stream comprising a base layer 300 and an enhancement layer 305. Enhancement layer 310 is encoded as a function of base layer 300. In such a video bit-stream format, there exists a picture to picture dependency since none of the base and enhancement layers contains tiles.

FIG. 3b illustrates another example of a scalable video bit-stream comprising a base layer 310 and an enhancement layer 315. According to this example, enhancement layer 315 is a tiled enhancement layer comprising, in particular, tile 320. In such a video bit-stream format, there exists a tile to picture dependency since tiles of the enhancement layer depend on the base layer.

FIG. 3c still illustrates another example of a scalable video bit-stream comprising a base layer 325 and an enhancement layer 330. According to this example, base layer 325 is a tiled base layer comprising, in particular, tiles 335 and 340, and enhancement layer 330 is a tiled enhancement layer comprising, in particular, tile 345 and tile set 350. Base layer 325 can be spatially enhanced with enhancement layer 330. In such a video bit-stream format, there exists a tile to tile dependency since tiles of the enhancement layer depend on tiles of the base layer. There also exists a tile set to tile dependency since a tile set of the enhancement layer depends on tiles of the base layer. For the sake of illustration, tile 345 depends on tile 340 and tile set 350 depends on tile 335. Other dependencies may exist such as a tile to tile set dependency or a tile set to tile set dependency.

It is to be noted that similar configurations exist for a SNR scalable layer which may or may not be tiled on top of a base layer which also may or may not be tiled.

Figure 4:
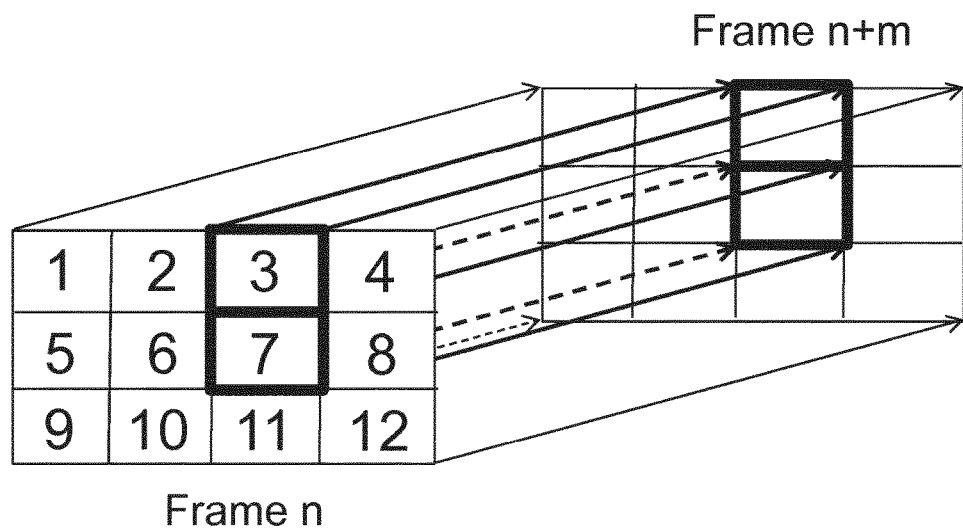
FIG. 4 illustrates a temporal pipe of tiles selected by a user to be displayed.

FIG. 4 illustrates a temporal pipe of tiles selected by a user to be displayed. More precisely, FIG. 4 represents a first video frame n and a second video frame n+m (where n and m are integer values), each of the first and second video frames comprising twelve tiles numbered 1 to 12. For the sake of illustration, only the third and seventh tiles are to be displayed (as denoted with bold lines) amongst these twelve tiles. Video frames n and n+m belong to a series of consecutive frames corresponding to a given temporal period. Therefore, the third and seventh tiles of each frame from frame n to frame n+m are displayed consecutively.

However, the data of a video bit-stream conforming to the standard mp4 file format are organized as temporal samples that correspond to full frames. Accordingly, it is required to access several small byte ranges for each frame when particular spatial areas of these frames are to be accessed during a given period of time as described above by reference to FIG. 4. This is inefficient in HTTP streaming in terms of the number of generated requests and in terms of data overhead. It is also less efficient for bit-stream extraction for RTP streaming because it requires multiple small file seeking operations.

Therefore, to provide a more efficient access in compressed videos for ROI streaming, the timed media data bit-stream is to be reorganized so that data of a particular tile are organized as a contiguous byte range (forming a pipe) for a given time period (i.e. a set of consecutive frames).

Accordingly, when only a spatial sub-part of video frames is to be displayed, only pipes of tiles corresponding to the selected spatial area must be downloaded (for instance tiles 3 and 7 in FIG. 2) using one HTTP request per pipe and per time period. Similarly, in RTP streaming, a server can extract more efficiently bigger data chunks from a source such as a hard disk, corresponding to a pipe of tiles.

Figure 5:
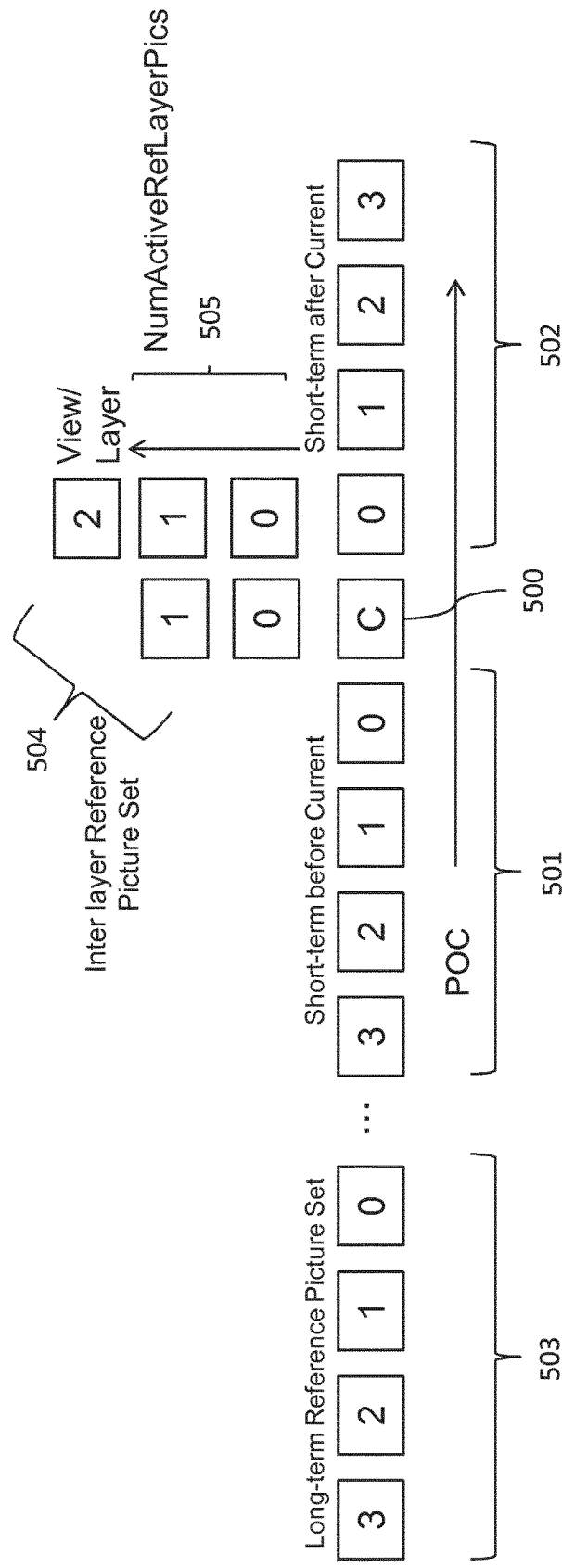
FIG. 5 illustrates the use of sets of reference pictures for encoding video data while using the multi-layer HEVC scheme.

The multi-layer extension of the HEVC standard impacts the prediction mode, notably the construction of the reference pictures, as illustrated in FIG. 5.

FIG. 5 illustrates the use of sets of reference pictures for encoding video data while using the multi-layer HEVC scheme or a similar scheme.

When a picture 500 is to be encoded, different predictors can be used. These predictors are chosen amongst reference pictures stored in various reference picture sets, typically a set 501 of reference pictures that correspond to short-term pictures preceding the current picture to be encoded, a set 502 of reference pictures that correspond to short-term pictures following the current picture to be encoded, a set 503 of reference pictures that correspond to long-term pictures preceding the current picture to be encoded, and a set 504 of inter-layer reference pictures.

It is to be noted that while short term reference picture sets and long term reference picture sets are commonly used for handling single layer HEVC, the multi-layer extension provides at least two additional reference picture lists in an inter-layer reference picture set, both associated to the current picture to be coded.

The maximum number of pictures present in a list of the set of inter-layer reference pictures is given by NumActiveRefLayerPics parameter 505.

For the sake of illustration, the reference pictures can be indexed as a function of a Picture Order Count (POC) and/or a LayerId value.

The maximum number of pictures present in a list of the set of inter-layer reference pictures is used in a slice segment header to provide, for each inter-layer reference picture that can be used, to predict current picture 500, the value of its layer identifier: the NAL unit headers layer identifier. Then, for a slice (or a tile when one tile corresponds to one slice), a list of inter-layer dependencies can be deduced. This impacts the "independently decodable" property of a tile. As such, this inter-layer dependency information should be associated with the description of a tile when encapsulated in file format to make sure that at playback or in streaming application data from dependent layer is also present for correct decoding and display of selected tile(s).

In the multi-layer extension of HEVC (ISO/IEC 23008-2 Annex F), a particular SEI message referred to as 'inter-layer constrained tile sets SEI message' is defined to indicate constraints on the inter-layer prediction process when layers are encoded with tiles. This SEI message is defined for a given layer as follows: "the inter-layer constrained tile sets SEI message shall not be present for a layer unless every PPS that is active for the layer has tile_boundaries_aligned_flag equal to 1 [in VPS VUI (Video Parameter Set, Video Usability Information)] or fulfills the conditions that would be indicated by tile_boundaries_aligned_flag being equal to 1".

Such a SEI message "indicates that the inter-layer inter prediction process is constrained such that no sample value outside each identified tile set, and no sample value at a fractional sample position that is derived using one or more sample values outside the identified tile set, is used for inter prediction of any sample within the identified tile set".

More specifically, the prediction constraints for each tile set i are given by a specific ilc_idc flag (ilc_idc[i]) whose value is defined as follows:
  0: undetermined;
  1: indicates that, within the CVS, no samples outside of the i-th identified tile set and no samples at a fractional sample position that is derived using one or more samples outside of the i-th identified tile set are used for inter-layer prediction of any sample within the i-th identified tile set with nuh_layer_id equal to ictsNuhLayerId, where ictsNuhLayerId is the value of nuh_layer_id of this message;
  2: indicates that, within the CVS, no prediction block in the i-th identified tile set with nuh_layer_id equal to ictsNuhLayerId is predicted from an inter-layer reference picture; and
  3: reserved.

Even if inter-layer reference pictures are present in the sets of reference pictures, they are not necessarily used. Moreover, for computation cost saving, an encoder can decide to encode tiles using only information from the same current layer and decide, from time to time, for example on random access frames, to use information from lower layer (s).

FIG. 6, comprising FIGS. 6a, 6b, 6c, and 6d, illustrates different types of inter-layer tile prediction. According to the illustrated examples, each frame of the video stream comprises at least two layers (layer i and layer i+1, layer i+1 being an enhancement layer of layer i).

Figure 6A:
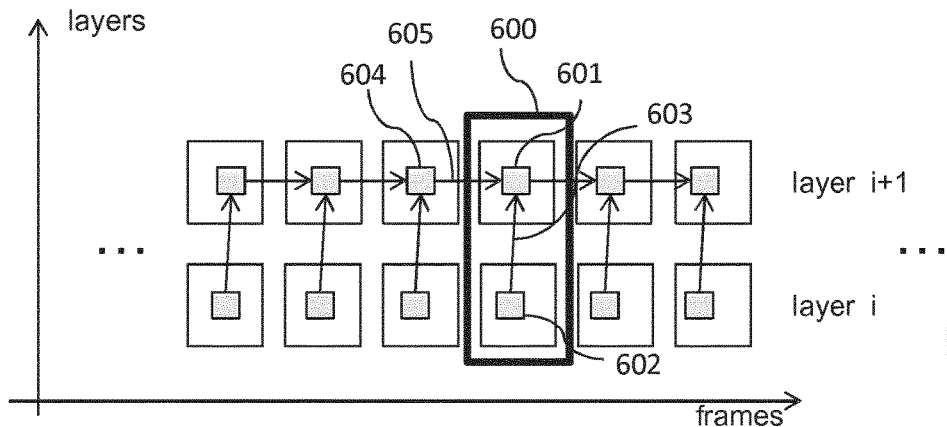
FIGS. 6a, 6b, 6c, and 6d, illustrate different types of inter-layer tile prediction.

According to the example illustrated in FIG. 6a, both intra and inter predictions are used for each tile of the enhancement layer of each frame.

For example, tile 601 of the enhancement layer i+1 of frame 600 depends on the corresponding tile 602 of the lower layer i of the same frame 600, as illustrated with arrow 603, and of the corresponding tile 604 of the enhancement layer i+1 of the previous frame, as illustrated with arrow 605.

The inter-layer prediction indication, represented by reference 603, indicates that a tile of layer i+1 depends on the corresponding tile of layer i, a set of tiles of layer i, or on full picture of layer i. Only some tiles of layer i+1 may depend on one or more tiles of a lower layer.

Moreover, the dependencies may vary in the video sequence over time as illustrated in FIGS. 3b to 3d where the encoder uses inter-layer prediction only on random access points represented by frames 610, 611, 620, 621, 630, and 631.

Figure 6B:
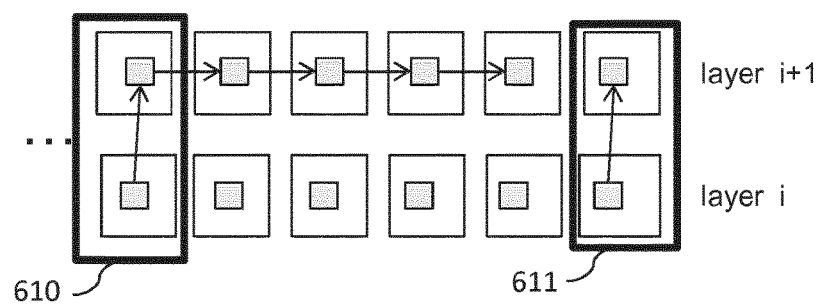

According to the examples illustrated in FIG. 6b, each tile of layer i+1 depends on the corresponding tile of the same enhancement layer i+1 of the previous frame or on one or more tiles of lower layer i. According to the example illustrated in FIGS. 6c and 6d, each tile of layer i+1 depends on the corresponding tile of the same enhancement layer i+1 of the previous frame and/or on one or more tiles of lower layer i.

In view of these different dependency schemes, the inter-dependency signaling for tile descriptors in file format should be set dynamically. Accordingly, to provide flexibility in the tile description and to support various encoder choices, the inter-dependency signaling is preferably dissociated from the tile description itself.

Figure 7:
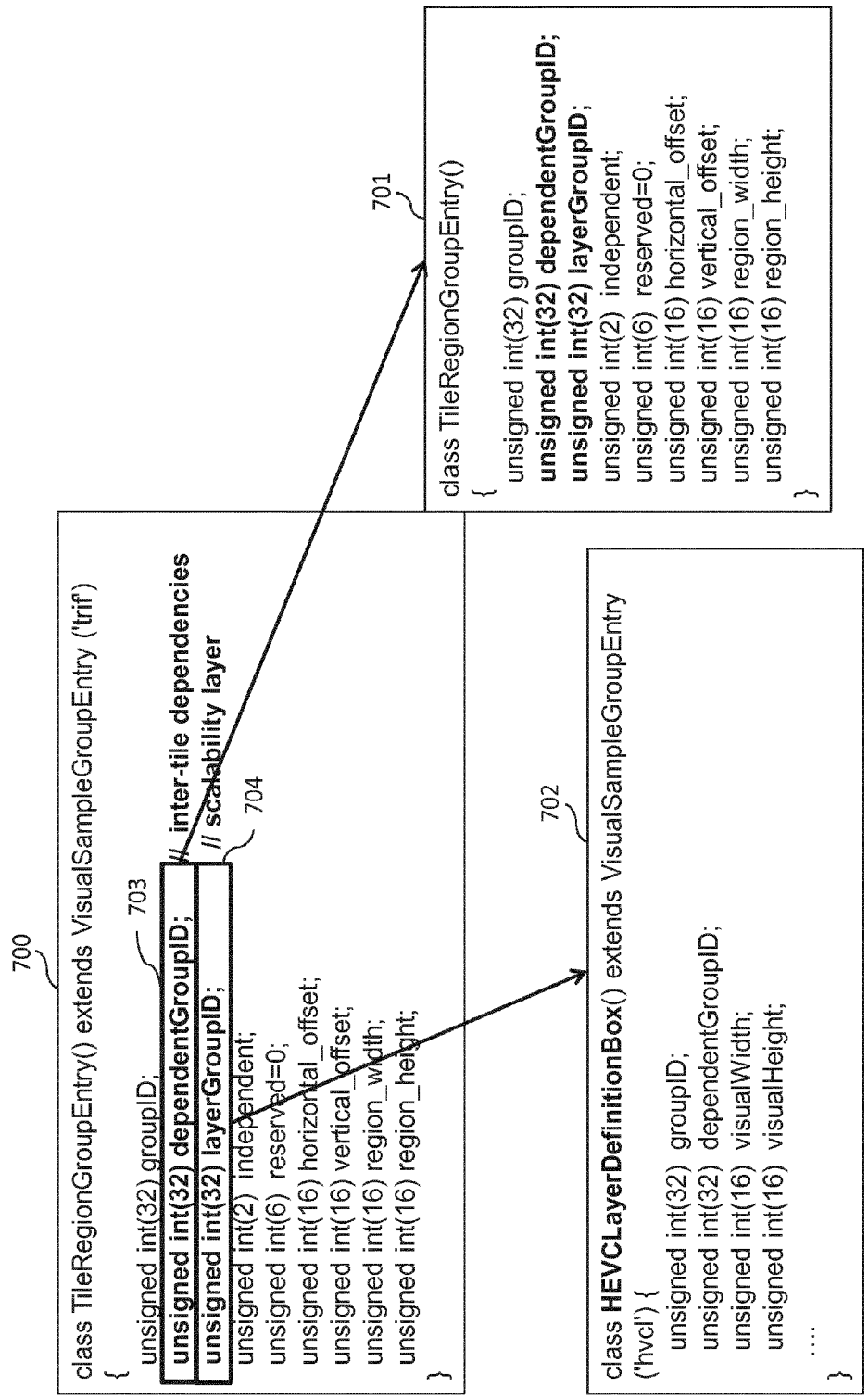
FIG. 7 illustrates an example of a tile descriptor enabling inter-layer dependency description.

FIG. 7 illustrates an example of a tile descriptor enabling inter-layer dependency description.

As illustrated, TileRegionGroupEntry descriptors 700 and 701 comprise, in the given example, dependentGroupID parameter 703 and layerGroupID parameter 704 for accessing scalability information and tile or picture dependency information. According to the given example, scalability information is stored within HEVCLayerDefinitionBox descriptor 702 and tile or picture dependency information is stored within TileRegionGroupEntry descriptor 701.

HEVCLayerDefinitionBox descriptor 702 illustrates an example of the parameters of an HEVCLayerDefinitionBox descriptor (or HEVCLayerDefinitionBox box) comprising an identifier, a dependency signaling mechanism and additional properties coming from the video elementary bitstream. For the sake of illustration, the additional properties comprise visual Width and visualHeight parameters. However, the additional properties mays also comprise other parameters such as a frame rate, a bit rate and profile and level information. They may also comprise high level syntax information describing a scalability layer.

The added and modified parameters of the modified TileRegionGroupEntry descriptor 701 can be defined as follows:
  dependentGroupID (reference 703) that gives the identifier of a tile (as defined by a TileRegionGroupEntry descriptor), of a tile set (as defined by a TileSetGroupEntry descriptor), or of an HEVC layer (as defined by an HEVCLayerDefinitionBox descriptor, for example HEVCLayerDefinitionBox descriptor 702) on which this tile depends. The parameter is preferably set to 0 when dependencies are derived from the track reference box;
  layerGroupID (reference 704) that gives the identifier of the HEVC layer (as defined by HEVCLayerDefinition- Box descriptor) to which this tile belongs. This parameter is set to 0 when dependencies are derived from the track reference box; and region_width and region_height that respectively define the width and height of the rectangular region represented by the tile, in term of luma samples, of the layer identified by parameter layerGroupID if its value is different from zero or of the frame as indicated in the visual sample entry of a 'stsd' box well known by the one skilled in the art and contained in the 'moov' box.

Similar added and modified parameters also apply to TileSetGroupEntry descriptor while modifying the number of bits used for encoding the parameter groupiD (since tiling and scalability configurations are combined and a single namespace is used, the number of values for groupID parameter is to be increased).

A needed adaptation is directed to the interpretation of the dependencyTileGroupID attribute that may define the identifier of a tile (as defined by a TileRegionGroupEntry descriptor), of a tile set (as defined by a TileSetGroupEntry descriptor), or of an HEVC layer (as defined by an HEVCLayerDefinitionBox descriptor) on which this tile set depends. If the value of the dependencyTileGroupID attribute is equal to zero, dependencies are derived from the track reference box.

For the sake of illustration, parameters of the HEVCLayerDefinitionBox descriptor (reference 702) can be defined as follows:

groupID that is a unique identifier for the layer described by the group. Value 0 is reserved for special use in the NALUMapEntry ('nalm') box;

dependentGroupID that indicates the groupID identifier of an HEVC layer (as defined by an HEVCLayerDefinitionBox descriptor) on which the layer depends. If the value of the dependentGroupID parameter is equal to zero, dependencies are derived from the track reference box ''stsd' mentioned above. This is for example the case when a scalable HVC (SHEVC) bit-stream enhances an AVC/H264 track;

visual Width that gives the value of the width of the coded picture or view in luma samples; and visual Height that gives the value of the height of the coded picture or view in luma samples.

An advantage of having a tiling referencing layer descriptor and having a layer descriptor able to reference either the tile or layer descriptor is to provide unified and flexible dependency signaling, all through the use of groupID identifiers. By unifying the identifier namespace for the groupID identifiers of tiles, tile sets and HEVC layers, and with the introduction of the two dependency identifiers (parameters dependentGroupID and /ayerGroupID), the following dependencies are simply defined:

dependencies between tiled layers;
dependencies between non-tiled layers;
dependencies between a non-tiled enhancement layer and a tiled base layer; and
dependencies between a tiled enhancement layer and a non-tiled base layer.

However, if the two parameters 703 and 704 respectively provide, for a given tile, dependency information on another tile and information on the layer of this tile, a limitation of such a solution is that it does not support multiple dependencies as required by the reference picture list mechanism described in HEVC. Moreover, the inter-layer dependency signaling being embedded in the tile descriptor itself, the tile signalization should be duplicated each time the inter-layer dependency changes. Indeed, since the same tile may have varying dependencies over time (at least from one GOP to another), the tiling configuration is to be duplicated for each possible dependency or an explicit dependency grouping is to be introduced.

A tile descriptor of the TileSetGroupEntry ('tsif') type, as illustrated in FIG. 8b, can be used for describing tile dependencies including inter-layer dependencies.

The tile descriptor of the TileSetGroupEntry type is generally used to define a set of tiles based on (intra-layer) coding dependencies. However, since the TileSetGroupEntry descriptor allows a tile set to be described using individual tile identifiers (tile IDs=groupID in a TileRegionGroupEntry), it is possible to indicate that a tile set is made of a single tile. Therefore, the dependency list that follows allows any number of tiles to be listed which could be from different layers. Hence, it is possible to list in a 'tsif' sample description box the dependencies of a tile to other tile IDs in lower layers.

For encapsulating HEVC scalable bit-streams such as those described by reference to FIG. 3 in a mp4 file, the latter should comprise the following:

for each tile of the base layer: one tile region flagged as "independent" (with a ilc_idc value equals to 1 (or 2 for IDR only)), that is to say a tile region that can be decoded without temporal dependencies from another tile in this layer;

for each tile of the enhancement layer: one tile region flagged as "independent" (with a ilc idc value equal to 1), that is to say a tile region that can be decoded without temporal dependencies from other tiles in this layer;

for each tile of the enhancement layer: one tile set made of a single tile and dependencies to the base tile(s); and a NALUMapEntry ('nalm') sample group description box with two entries:

one entry mapping NALUs to a 'tsif' group, where use of inter-tile dependencies (including inter-layer dependencies) is described; and one entry mapping NALUs to a 'trif' group for independent tiles (i.e. tiles having no dependencies to other, non-co-located, tiles).

To handle the description of dependencies between a tile layer and a non-tile layer (as described by reference to FIGS. 3a and 3b, the tile description design can be extended for allowing a non-tile layer to be described by a descriptor so that all dependencies between layers, whether tiled or not, can be expressed through a single description tool (the TileSetGroupEntry descriptor).

FIG. 8, comprising FIGS. 8a and 8b, illustrates a single layer tile descriptor 800, modified according to a particular embodiment of the invention, and a tile set descriptor 850, respectively, enabling the description of decoding dependencies to other tiles.

The independent parameter, denoted 801, specifies the coding dependencies between the defined tile and other tiles in the current frame and in reference frames of the same layer. Inter-tile dependencies, if any, are indicated by means of the dependency list parameter 851 of the descriptor TileSetGroupEntry as illustrated in FIG. 8b.

A new parameter, called full frame parameter and denoted 802, indicates, when set, that the defined tile is actually a complete frame, in which case parameters region_width and region_height, denoted 803, are set to the layer size of the luminance component. In such a case, parameter independent is set to 1. This allows dependencies to be expressed between tiles of a layer to a non-tiled layer using the 'tsif' sample group referencing a 'trif' sample group with full frame parameter set to 1, i.e. in a unified way, whatever the tiling configuration across layers (tiled or not).

As illustrated in FIG. 8b, dependencies can be defined as a set of tile identifiers (reference 852) or as a reference area that can be itself defined using two points corresponding to the top left vertex and the bottom right vertex (reference 853) representing a rectangle.

Since the dependency list parameter of the tile set descriptor, denoted 851 in FIG. 8b, indicates whether or not the tile set is self-contained but does not enable distinguishing between intra-layer dependencies and inter-layer dependencies. Then, to avoid any ambiguity in case of scalability (the dependency list parameter may indicate that the tile set in the current layer does not depend on a base layer or that the set of tiles across layers is self-contained) and for interoperability when encapsulating/parsing tile tracks, a particular meaning can be given to the dependency list parameter as illustrated in FIG. 9.

FIG. 9 illustrates an example of a tile set descriptor 900 for multi-layer tiling.

According to the illustrated example, the dependency list parameter of tile set descriptor 900 is coded over three bits or more, each bit having a particular meaning.

As represented with references 901, 902, and 903, respectively, the two first least significant bits indicate whether or not some dependencies are declared with their type in case some are declared. The binary value 00 means that no dependencies are signaled (test 901), the value 01 means only Intra-layer dependencies are signaled (test 902), the value 10 means only Inter-layer dependencies are signaled (test 903) and finally the value 11 indicates that both intra and inter-layer dependencies are signaled (902 and 903 are present). The third least significant bit then indicates whether the list of dependencies is provided as a list of tile group identifiers (value 0) or as an area.

Tile set descriptor 900 corresponds to a simple example in which the inter-layer tile dependencies are signaled without providing any layer information, thus requiring only 3 bits for the dependency list parameter. Additional bits can be used (preferably up to 5 in total) to provide more precise description of the inter-layer tile dependencies.

According to a particular embodiment (not illustrated), a fourth bit is used when inter-layer dependencies are present ($2^{nd}$ least significant bit set to 1) to indicate that dependencies are organized by layers (e.g. value 1) or not. Then, depending on a signaling mode (list or area given by the $3^{rd}$ least significant bit of dependency list, reference 904) indicating whether the dependencies are described as a list of tile group identifiers or as an area, a single ($3^{rd}$ bit value to 1) or double list ($3^{rd}$ bit value to 0) is created. The double list contains the number of layers and, for each layer, the list of tile group identifiers this tile at current layer depends on. The single list just contains the number of layers and, for each layer, provides the area the current tile of current layer depends on. The parser then assumes that layers are organized in descending order from current layer to the base layer. Instead of a flat list of dependencies, the parser then has an indication of the tracks the current tile track depends on. This limits the search space in the set of tracks to map.

According to another embodiment (not illustrated), that can be considered as an improvement of the previous one, a fifth bit is used when the fourth bit is set to one, that is to say when the inter-layer tile dependencies are described by layers. In this case, the fifth bit signals for each layer an item of layer identifier information. For example, we would have the following parameters (assuming $3^{rd}$ bit set to 1 to describe the dependencies as a list of tile group identifiers):

```
if ((dependency_list&2 == 1) // inter-layer dependencies {
    if (dependency_list&8 == 1) { // 4th bit to 1: layer-based
    organization
        unsigned int(16) layers_count;
        for (I=1; I<= layers _count; I++){
            if (dependency_list&16==1) { // 5th bit to 1: layer ID is
            present
                unsigned int(16) layer_ID;
            }
        unsigned int(16) dependency_tile_count;
        for (i=1; i<= dependency_tile_count; i++){
            unsigned int(16) dependencyTileGroupID;
        }
    }
}
```

The layer_ID in the above example can take the value contained in the NAL unit header: nuh_layer_id. The parser processing the so-encapsulated file has to find layer related information by parsing the dedicated box that describes this specific layer, for example a TierInfoBox from MPEG-4 Part 15 standard, a LayerInfoBox as suggested by Nokia in an MPEG contribution, in the HEVCLayerDefinitionBox 702 in FIG. 7, or from any metadata box providing layer information. This box can be identified through its ID. This helps the mp4 parser in associating more rapidly the dependent tile to a layer information box or to a layer description like for example the HEVCLayerDefinitionBox 702 of FIG. 7.

In case the fifth bit is set to 0, then no layer identifier is provided. In this case, it is assumed that layers are organized in descending order, then for each layer a list of tile group identifiers or an area can be specified. When at a given layer, no dependency exists, it is expressed with dependency_tile_count=0 or topLeftDependencyTileGroupId and bottomRightDependencyTileGroupId both equal to 0.

Still according to another embodiment, when inter-layer dependencies are organized per layer with layer ID information ($4^{th}$ and $5^{th}$ bit having their value to 1) and as a list of tile group identifiers ($3^{rd}$ bit set to 0), it is to be interpreted as a dependency to the co-located tile set in the same frame in the identified layer. In this case (that is a common case), the description is shorter since we don't have the last loop of the previous example. This is signaled by putting dependency_tile_count to the value 0xFFFF. In case inter-layer tile dependencies are signaled as an area ($3^{rd}$ bit set to 1) the signaling of inter-layer dependent co-located tiles can be expressed by setting both topLeftDependencyTileGroupID and bottomRightDependencyTileGroupID of the TileSetGroupEntry to 0xFFFF. When the tile_boundaries_aligned_flag of the VPS in the video elementary stream is set to one, the parser can rely on the tile index to find the co-located tiles or can apply the ratio of current tile size obtained from the TileRegionGroupEntry or referenced tile size to the current tile positions 803 to find the positions of the co-located tiles in the dependent layer.

Whatever the selected signaling for inter-layer tile dependencies, the information can be read from the inter-layer constrained tile sets SEI message when present. This SEI message, by definition, indicates for each tile set in a given layer whether this tile set has dependencies to other layers or not (ilc_idc parameter). Then, by reading this information, an mp4 writer is able to set the $2^{nd}$ bit of the dependency-list of the TileSetGroupEntry describing the given tile set. To determine which layer the current tile set can depend on, the mp4 writer can read other information contained in the extension of the Video Parameter Set (VPS) in direct_dependency_flag parameter. This array provides the list of direct dependencies from one layer to another. Then, when the list of inter-tile layer dependencies can be built, for example layer by layer (4th bit set to 1) by creating an input list of tile dependencies for each layer for which the direct_dependency_flag parameter has the value 1 (indicating a dependency from current layer to this given second layer). When the value of the ilc idc parameter indicates a self-contained tile set, then the last embodiment can be used with the specific value −1 for dependency_tile_count tile_in order to signal that dependent tiles are the co-locate ones in the current layer. Otherwise, the tile constraints can be get from another SEI message that indicates the motion constraints on the tiles.

The solution described above provides inter-layer tile dependency signaling for a group of samples or group of NALUs for a given track or track fragment. To make it more flexible and dynamic, for example to handle the different types of inter-layer tile prediction illustrated in FIG. 6, several solutions can be considered.

Figure 10:
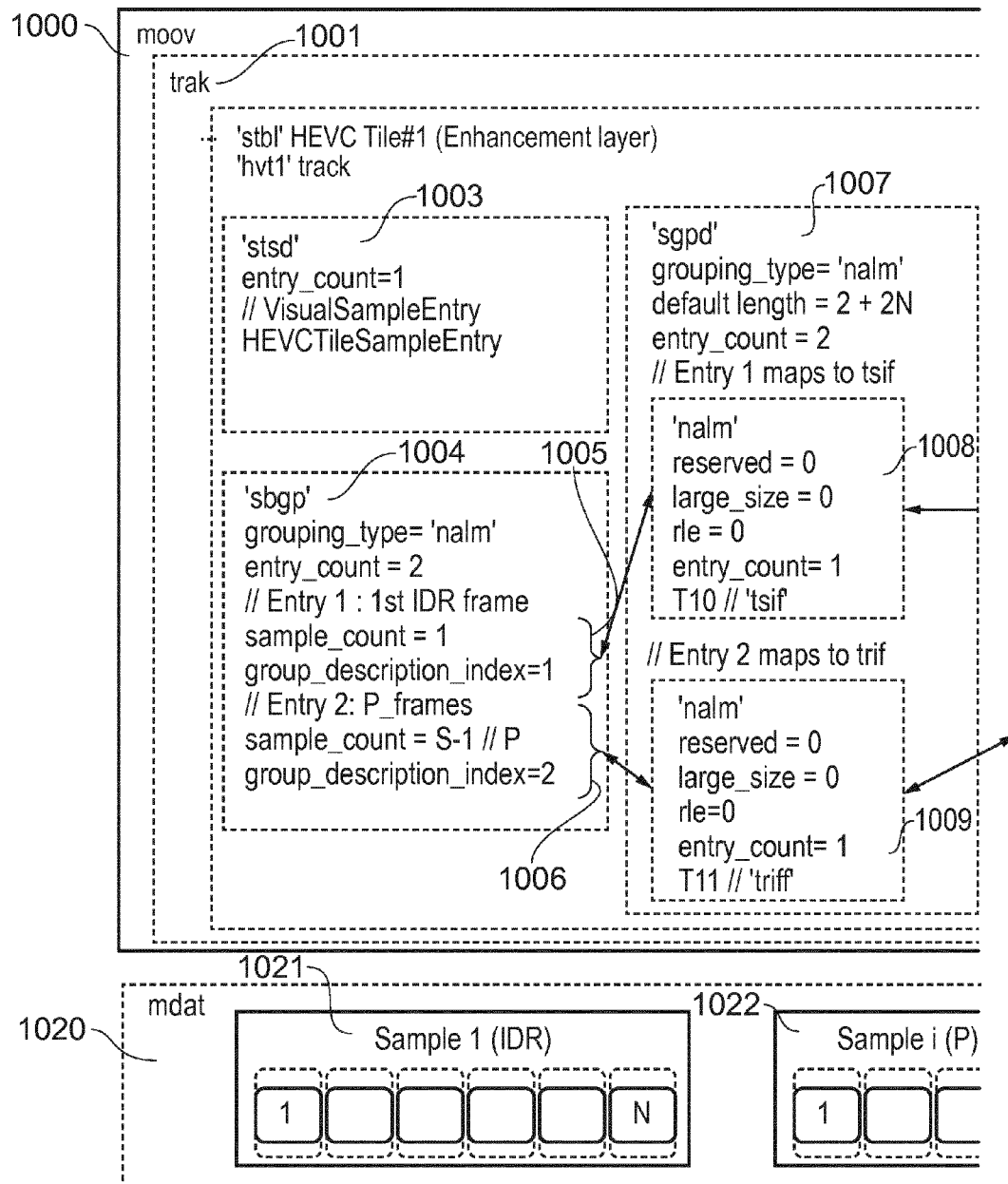
FIG. 10 illustrates an example of signaling inter-layer dependencies in a tile track.
Figure 10:
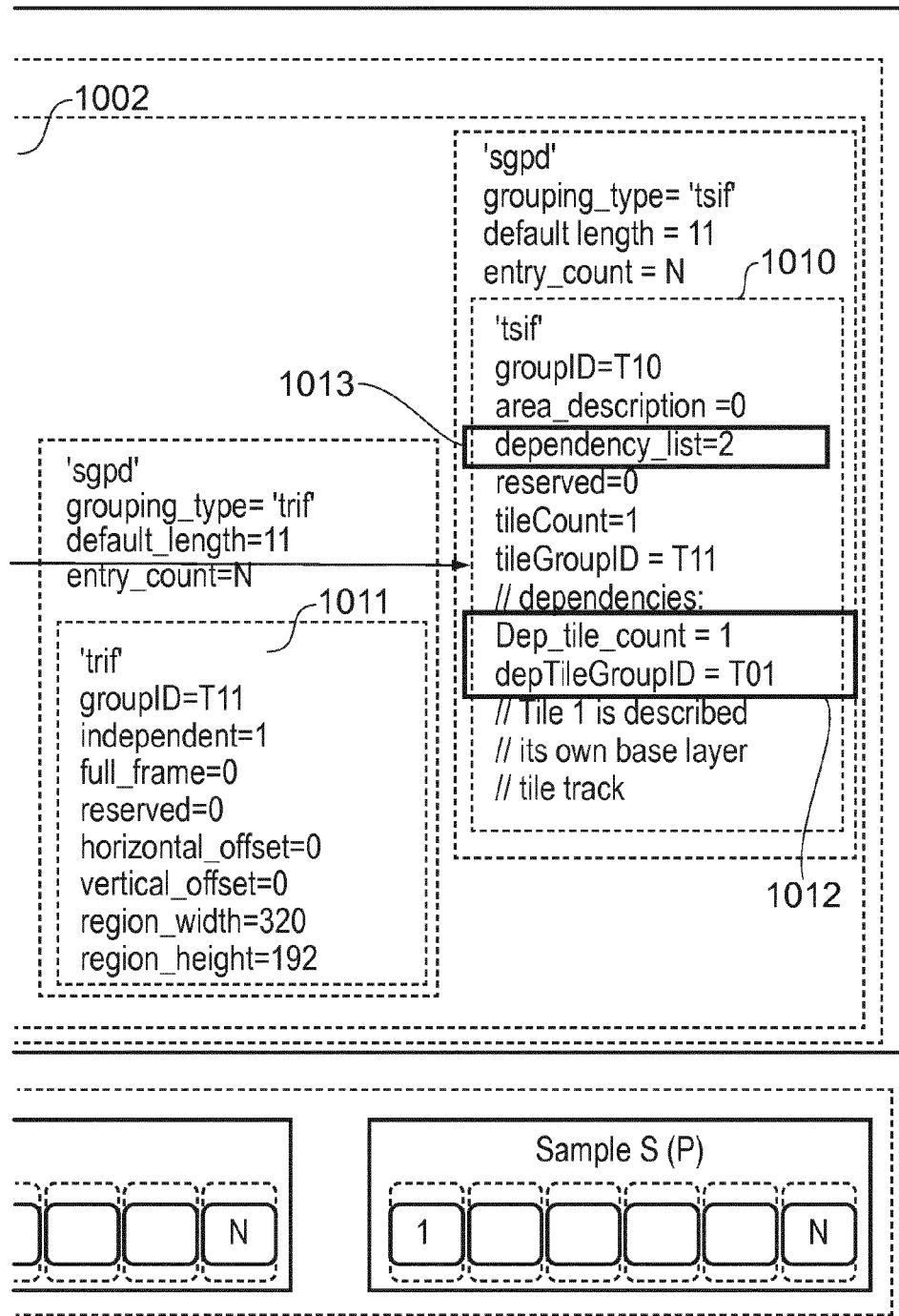

According to a first solution illustrated in FIG. 10, a mapping of samples according to their inter-layer prediction can be done using a NALU MapEntry. For the sake of clarity, only the header 1000 of an mp4 file containing a set of tile tracks, each tile track comprising one tile and S samples and each sample comprising N NAL units, is illustrated.

Still for the sake of clarity, an example of only one tile track description 1001 is illustrated with its sample box table 1002 describing the properties of the corresponding samples. The track identifier, for example the track₁₃ID parameter of the track header box (not represented here), indicates that it is a tile track of an enhancement layer 1.

The sample entry box 1003 describes the samples as being HEVC tile samples (HEVCTileSampleEntry) and the SampleGroupDescription box 1004 indicates the 'nalm' grouping type for the group entries and defines sample groups. As illustrated, tile samples are split into two sets 1005 and 1006 corresponding to tile samples with inter-layer dependencies and tile samples without inter-layer or intra-layer dependencies, respectively. The sets of samples map respectively the NALUMapEntry 1008 and 1009 defined in the SampleGroupDescription box 1007.

The first NALU map 1008 maps associated NAL units to the TileSetGroupEntry 1010 that describes the inter-layer tile dependencies as illustrated with references 1013 (dependency parameter: dependency_list=2) and 1012 (reference of the tile on which the current tile depends groupID=T01). The other NAL units are mapped to the TileRegionGroupEntry 1011 that does not define any inter-layer or intra-layer dependency. The video data are placed in the 'mdat' box 1020 as a list of samples 1021-1023, each conveying the tile data.

Figure 6C:
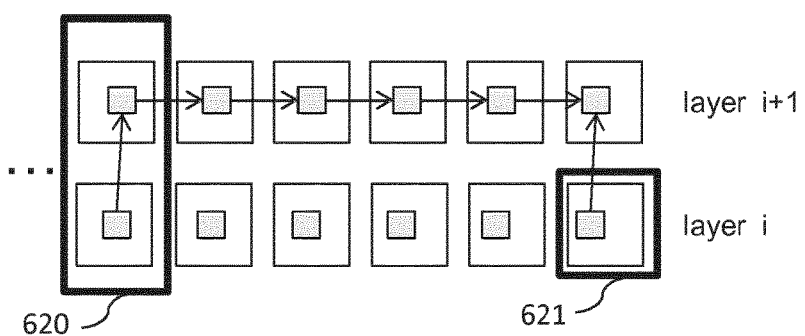
Figure 6D:
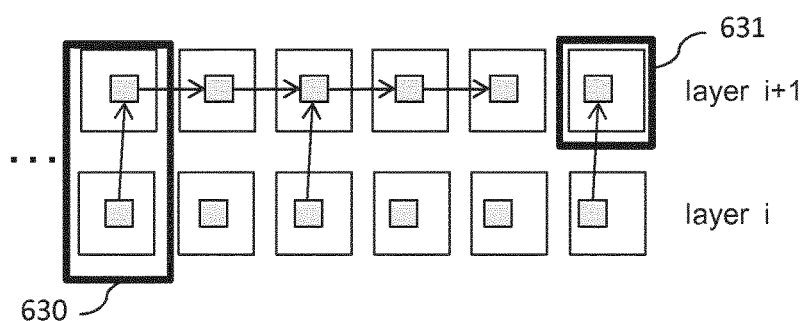

According to a second solution corresponding to a specific embodiment based on the use of a proprietary server and mp4 writer and of a proprietary client device and mp4 parser, the encoder is controlled to generate regular inter-layer prediction patterns and the mp4 writer is controlled to generate tile track fragments matching the random access points such as the one shown in FIGS. 6b and 6c. In the latest version of ISO/IEC JTC1/SC29/WG11 MPEG/N14727, Sapporo, Japan, July 2014, these points are alternatively called stream access points or SAPs. By using a regular inter-layer prediction pattern, the mp4 writer can generate more compact description by mapping all samples using default sample grouping to a TileSetGroupEntry, this TileSetGroupEntry referencing a TileRegionGroupEntry describing the tile and TileSetGroupEntry describing the dependencies on the base layer for the random access samples referenced 610, 611 and 620, 621 in FIGS. 6b and 6c. The dependency description is more compact in terms of byte size, compared to the solution described by reference to FIG. 10, since the NALU maps 1008 and Instead, all samples in the track are mapped to a TileSetGroupEntry using the default sample grouping mechanism of ISO BMFF. The random access samples 610, 611 and 620, 621 are described in a sample group description box of the 'sync' or 'ras' type providing random access points, both containing specific VisualSampleEntries. The entries described as random access points are samples to which the inter-layer tile dependencies apply. A specific value of dependency_list is reserved to provide the inter-layer dependencies for these random access samples:

```
if ((dependency_list==1)|| (dependency_list==3)) {
    unsigned int(16) dependency_tile_count;
    for (i=1; i<= dependency_tile_count; i++){
        unsigned int(16) dependencyTileGroupID;
    }
    if (dependency_list==3) {
        unsigned int(16) idr_dependency_tile_count;
        for (i=1; i<= idr_dependency_tile_count; i++){
            unsigned int(16) idr_dependencyTileGroupID;
        }
    }
}
```

Alternatively, when area mode description is selected, the values 2 and 4 can be used as follows:

```
if ((dependency_list==2)|| (dependency_list==4)) {
    unsigned int(16) topLeftDependencyTileGroupId;
    unsigned int(16) bottomRightDependencyTileGroupId;
    if (dependency_list == 4) {
        unsigned int(16)  idr_TopLeftDependencyTileGroupId;
        unsigned int(16) idr_BottomRightDependencyTileGroupId;
    }
}
```

In this embodiment, the dependency list parameter uses the value 3 or 4 to indicate that an additional list of tile dependencies is given for the case where the sample is an IDR (Intra Decoding Refresh), a CRA (Clean Random Access), or a BLA (Broken Link Access) picture (i.e. random access samples). The parameters idr_dependency_tile_count and idr_dependencyTileGroupID specify the list of tile region and tile sets this tile set depends on when the sample this tile belongs to is an IDR, CRA or BLA picture. The parameters idr_TopLeftDependencyTileGroupId and idr_BottomRightDependencyTileGroupId respectively specify the identifiers of the top-left tile and bottom right tile in the dependent layer.

As in previous embodiment, this one can be extended with a signaling per layer.

For efficient temporal access to video content, the ISO BMFF defines a tool called extractor. Extractors are file format internal structures enabling efficient extraction of NAL units from other tracks. These structures which are directly inserted into bit-streams use dedicated NAL unit types reserved for the application and transport layer by each coding format (e.g. type 31 for ISO/IEC 14496-10 video). They enable organizing video data in several tracks without duplicating data.

Extractors were initially designed for scalable video data such as video data conforming to the SVC or MVC format. In those formats, the layered media data organization can be efficiently represented by using multiple dependent tracks, each track representing the video at a particular level of scalability. For example, the bit-stream of an enhancement layer track may comprise extractors that reference NAL units from a base layer track. When such an enhancement layer track is extracted from the file format, extractors are replaced by the data that they are referencing.

More recently, extractors have also been defined in HEVC file format for efficient encapsulation of multi-layer HEVC and HEVC tiles into separate tracks. Accordingly, each of the independent tiles to be indexed is represented by a specific track called a 'tile track' as described by reference to FIGS. 11 (1120-1 and 1120-12).

Figure 11:
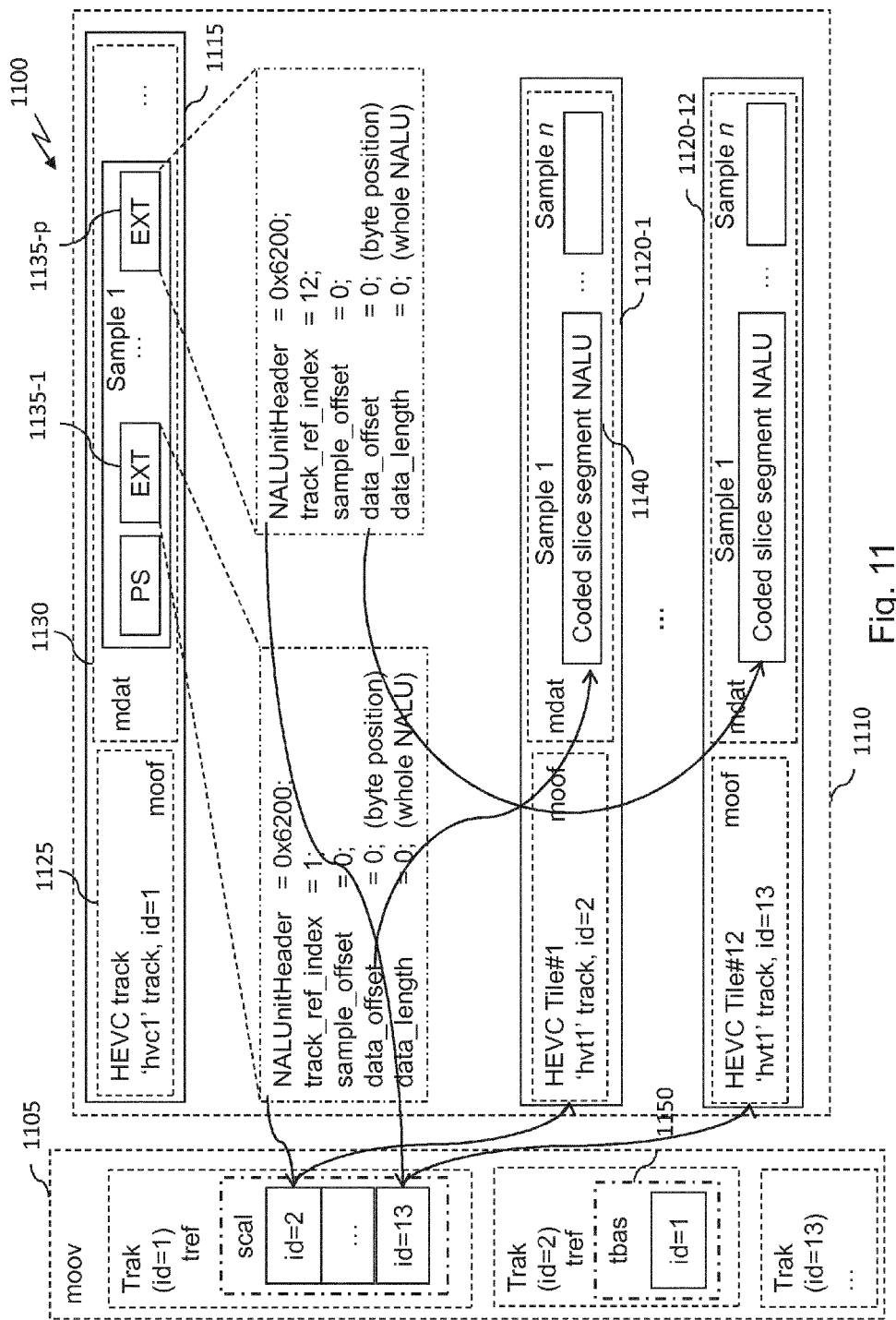
FIG. 11 illustrates an example of encapsulating an HEVC bit-stream as a set of tracks comprising a base track and independent tile tracks.

However, when mixing tiling and scalability, the number of required extractors may grow significantly. As such, in a preferred embodiment, tile tracks shall not use extractors. Tile tracks are referenced (via a track reference box 'tref' of a movie box 'moov' containing a 'scal' definition for each of the tile tracks) by a base track (1115) that corresponds to the HEVC bit-stream in full-frame as illustrated in FIG. 11. Only this base track containing the associated layer may use extractors to indicate how the original bit-stream is reconstructed. The base track is identified by tile tracks thanks to the 'tbas' track reference (1150).

An HEVC sample stored in a tile track is a complete set of slices for one or more tiles, as defined in ISO/IEC 23008-2, i.e. only the VCL NAL units forming those slices. This implies that the tile sample shall not contain any parameter set, SEI message or other non-VOL NAL units. At the opposite, the base track contains the various parameter sets (e.g. video parameter set, sequence parameter set, and/or picture parameter set) corresponding to initialization data. It also contains extractors (i.e. NAL units of a specific type) that point to samples in tile tracks.

As described above, an extractor can be a file format internal structure having the following syntax:

```
class aligned(8) Extractor ( ) {
    NALUnitHeader( );
    unsigned int(8) track_ref_index;
    signed int(8) sample_offset;
    unsigned int((lengthSizeMinusOne+1)*8) data_offset;
    unsigned int((lengthSizeMinusOne+1)*8) data_length;
}
```

Extractors act as pointers or references to data from other tracks and enable compact tracks to be built with references to dependent tracks instead of data duplication in both tracks. An extractor preferably uses the NAL unit syntax. Accordingly, it comprises a header having the same structure as a NAL unit header, comprising, in particular, information pertaining to the NAL unit type. This NAL unit type is set, for example, to the value '49' currently corresponding to a reserved NAL unit type in HEVC. The header is followed by an index (denoted track ref index) in the track reference box (tref) that allows retrieving the entry of type 'scal' of the tref box that contains the identifier of the track (track id) corresponding to the track that is referenced by the extractor. A third parameter is a time offset of the sample (sample_offset) that is referenced by the extractor in comparison to the current sample. The fourth and fifth parameters (denoted data_offset and data_length) respectively provide the position (preferably in bytes) from where to copy and the amount of data to copy (the value 0 is reserved to indicate the copying of the whole referenced NAL unit).

FIG. 11 illustrates an example of encapsulating an HEVC bit-stream as a set of tracks comprising a base track (1115) and independent tile tracks (1120).

As illustrated, the encapsulated bit-stream 1100 comprises an initialization segment file 1105 containing a movie box ('moov') providing a definition for tracks and media segment file 1110 representing a base track 1115 and twelve tile tracks 1120-1 to 1120-12 (each of the tile tracks 1120-1 to 1120-12 being associated with one tile of the video sequence).

Base track 1115 comprises a segment type box 'styp' (not represented), at least one movie fragment box 'moof' 1125 comprising metadata such as a track segment type and an identifier, and at least one media data box "mdat" 1130 comprising, for each video data sample, PPS and references to video data.

Similarly, each of the tile tracks 1120-1 to 1120-12 comprises a segment type box "styp" (not represented), at least one movie fragment box "moof" comprising metadata such as a track segment type and an identifier, and at least one media data box "mdat" comprising compressed video data packaged in NAL units (NALUs).

Tile tracks 1120-1 to 1120-12, having identifier 2 to 13, are referenced in track reference box "tref" 1135 of initialization segment file 1105 (more precisely of the movie box "moov" of the initialization segment file 1105, in the definition of the base track having identifier id=1).

As illustrated, base track 1115 comprises extractors acting as pointers or references to data from other tracks. For the sake of illustration, several parameters amongst which an index of a tile track (track ref index), a data offset (data_offset), and a data length (data_length) corresponding to extractors 1135-1 and 1135-*p* of base track 1115 are represented.

Still for the sake of illustration, when NAL unit 1135-1 of base track 1115 is processed, it is determined that it represents a NAL unit of the extractor type (NALUnitHeader equals to the hexadecimal value 6200). Accordingly, it is processed in order to retrieve corresponding compressed video data. To that end, its tile track index (i.e. track_ref_index=1) is obtained. From this index, it is possible to retrieve a tile track identifier from the tile track definitions stored in the initialization segment file 1105. In the given example, since the index is equal to one, the first tile track identifier of the 'tref' box is selected (id=2). Next, this identifier is used to access the corresponding tile track and then, using data offset (i.e. a relative index of a sample in the identified track that is to be used as the source of information) and data length (i.e. the number of bytes to copy, for example the whole NALU when data_length=0) parameters of extractor 1135-1, compressed video data are extracted from tile track 1120-1 (i.e. coded slice segment NALU 1140 in the given example).

After having been processed an extractor is replaced by the data it references. According to the example illustrated in FIG. 11, the parsing and processing of extractor 1135-1 lead to its replacement by the coded slice segment NALU 1140, thus forming an HEVC compliant bit-stream.

It is to be noted that the semantic used for storing parameters of an HEVC extractor can be close to the one defined in the SVC standard. Accordingly, for an extractor referencing HEVC NAL units, the following can apply:

the parameter known as forbidden_zero_bit is set as specified in ISO/IEC 23008-2;

the parameter known as nal_unit_type is set to 49 (reserved code in current FDIS);

the parameters known as nuh_layer_id and nuh_temporal_id_plus1 are copied from the first NALU referenced by the extractor (an extractor in an HEVC track referencing HEVC NAL units does not reference several NAL units with different nuh_layer_id and nuh_temporal_id_plus1 values); and the parameter known as sample_offset is set to 0.

It is also to be noted that according to a particular embodiment only a subset of the tiles of an HEVC sequence can be decoded. In such a case, the tile dependency information stored in the TileRegionGroupEntry and TileSetGroupEntry sample group descriptions can be used to discard un-needed tile tracks or ignore some extractors while decoding an HEVC tile track.

Figure 12:
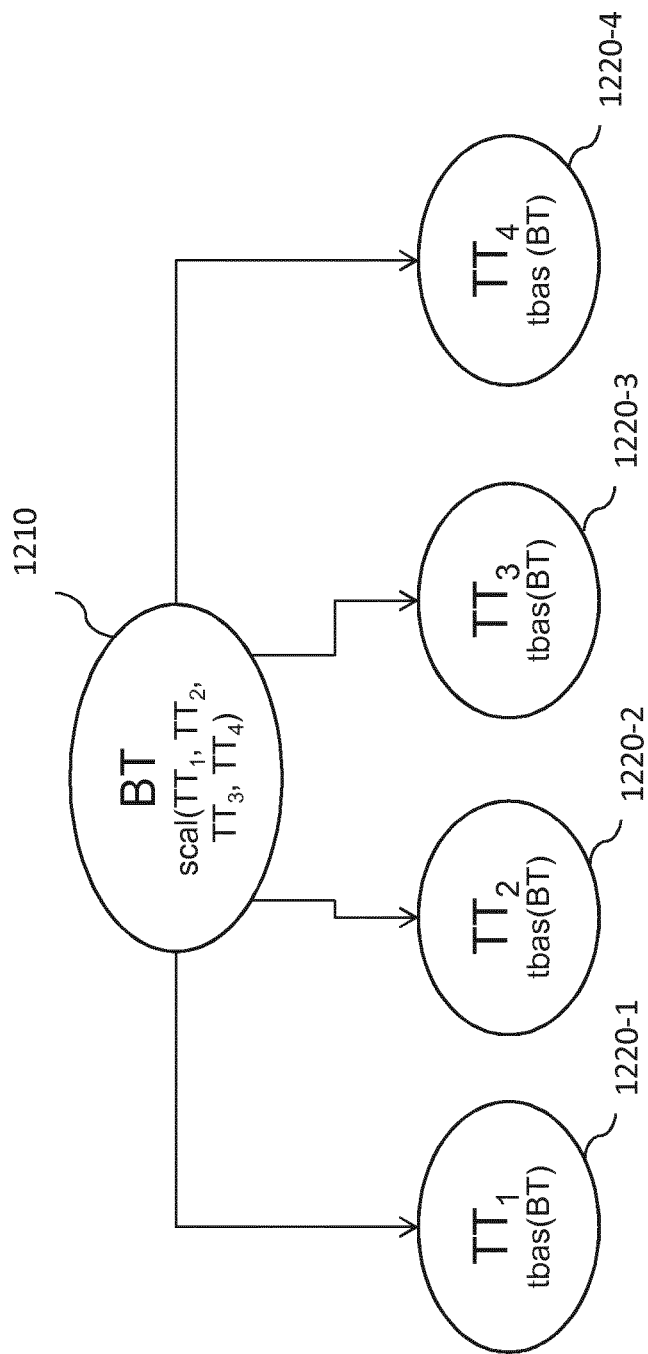
FIG. 12 illustrates a simplified overview of dependencies between tracks in the case of an HEVC bit-stream comprising four tiles, each tile being stored in a separate tile track.

FIG. 12 illustrates a simplified overview of dependencies between tracks in the case of an HEVC bit-stream comprising four tiles, each tile being stored in a separate tile track.

As described above, a base HEVC track 1210, denoted BT, contains data common to all tiles, in particular the various parameter sets (e.g. video parameter set, sequence parameter set, and/or picture parameter set). It signals the dependencies on tile tracks with a reference of the 'scal' type in a 'tref' box. For each sample, it also contains extractors (represented by arrows) pointing to each tile tracks 1220-1 to 1220-4, denoted TT1 TT2, TT3, and TT4, respectively. As illustrated, each tile track identifies the HEVC base track with a reference of the 'tbas' type.

When considering both tiling and multi-layer bit-streams such as scalable HEVC format (SHVC), several bit-stream configurations are possible, as follows:
both base and enhancement layers not tiled;
base layer tiled and enhancement layer not tiled;
base layer not tiled and enhancement layer tiled; and
both base and enhancement layers tiled.

The use of extractors enables an efficient organization of video data for handling both tiling and scalability (multi-layer).

Figure 13:
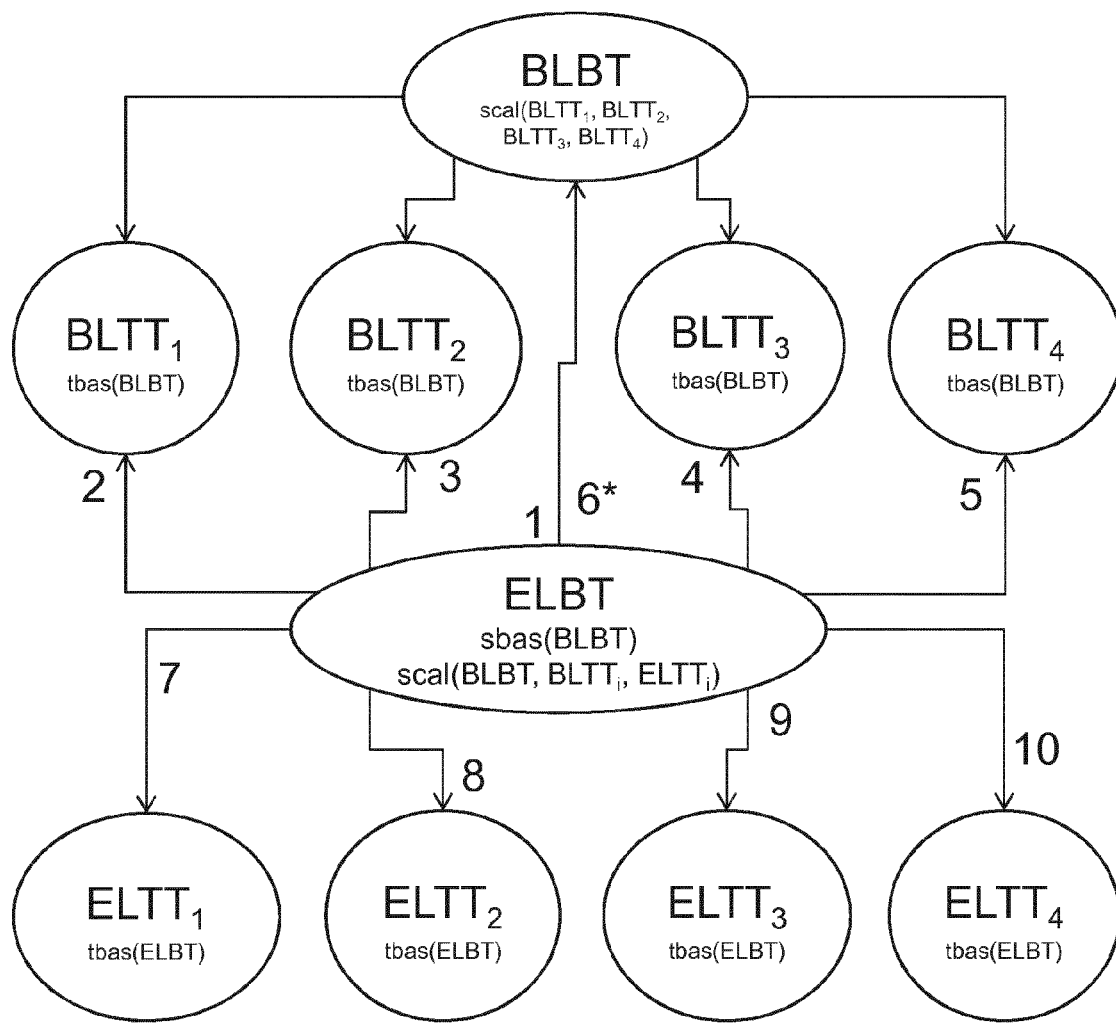
FIG. 13 illustrates a simplified overview of dependencies between tracks in the case of a scalable HEVC bit-stream comprising a base layer and an enhancement layer, base and enhancement layers being tiled.

FIG. 13 illustrates a simplified overview of dependencies between tracks in the case of a scalable HEVC bit-stream comprising a base layer and an enhancement layer, base and enhancement layers being tiled (four tiles in this example).

The base layer is organized as described by reference to FIGS. 11 and 12. A base layer base track, denoted BLBT, signals the dependencies on the four associated base layer tile tracks, denoted BLTT1 to BLTT4, with a reference of the 'scal' type. In turn, each base layer tile track identifies the base layer base track with a reference of the 'tbas' type.

Each sample in the base layer base track comprises data to be shared by all tiles in the sample (e.g. parameter sets, various SEI messages). Each sample in the base layer base track also comprises one extractor pointing to the associated tile sample for each base layer tile track that composes the sample.

The same principle applies to the enhancement layer. However, since an extractor must not reference, directly or indirectly, another extractor, according to definition of the extractor in the current standard, the structure of the dependencies is more complex.

Indeed, the enhancement layer base track, denoted ELBT, must reference, using extractors, the base layer base track, the base layer tile tracks, and the enhancement layer tile tracks, denoted ELTT1 to ELTT4. Accordingly, a sample of the enhancement layer base track is composed of:
one extractor (extractor 1) pointing to common data of the base layer base track;
one extractor (extractors 2 to 5) pointing to each base layer tile track;
optionally, extractors (extractors 6*) pointing to any SEI suffix messages of the base layer base track;
NAL units common for the enhancement layer;
one extractor (extractors 7 to 10) for each enhancement layer tile track; and
optionally, SEI suffix messages.

This structure that conforms the current specification requires a large number of extractors in each sample of the enhancement layer base track. For example, when considering a 2×2 tiling at 25 Hz, the bandwidth required for transmitting the extractors of the enhancement layer base track is 24 kbps (10 extractors x 12 Bytes×25 Hz×8 bits).

Since the same extractor pattern is repeated for tiles at a given layer in all upper layers, the overhead related to extractors increases with each upper layer.

Figure 14:
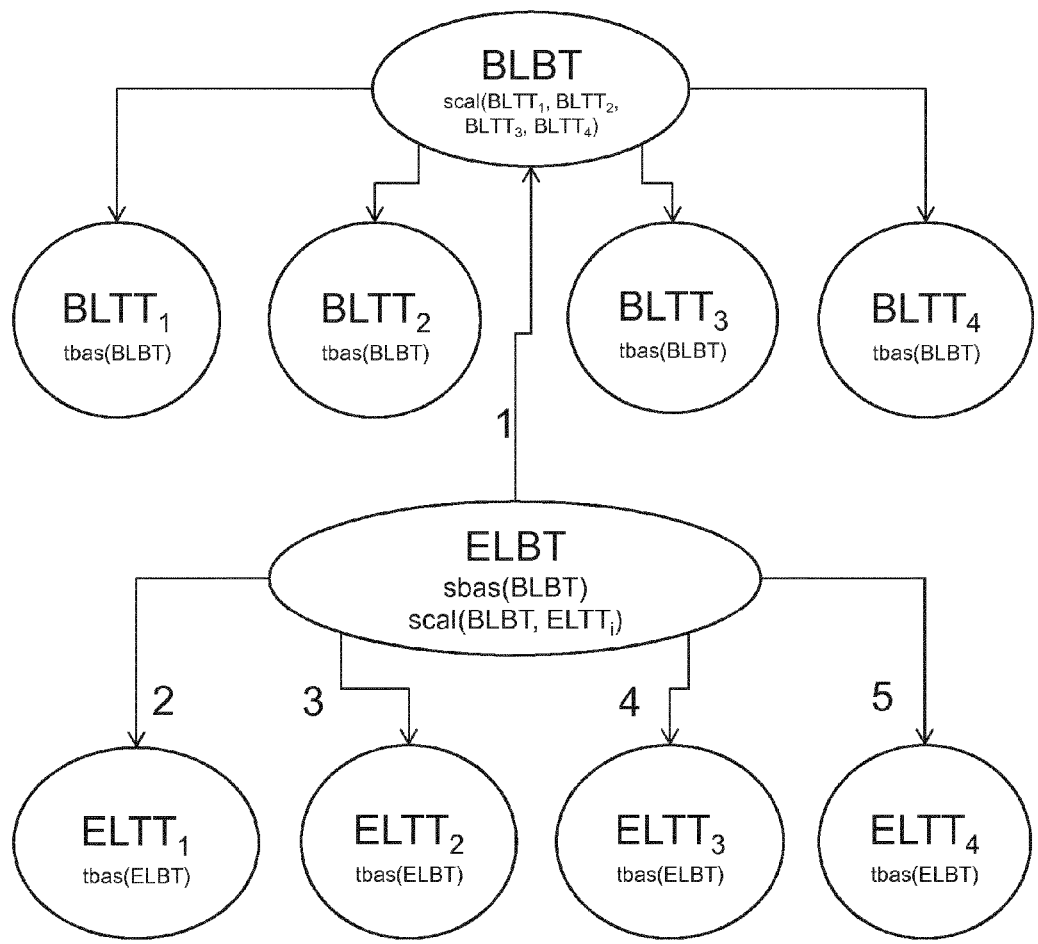
FIG. 14 illustrates a simplified overview of dependencies between tracks in the case of a scalable HEVC bit-stream comprising a base layer and an enhancement layer, base and enhancement layers being tiled, when recursive extractors are used.

To avoid such a multiplication of extractors, recursive extractors can be used, as illustrated in FIG. 14.

A recursive extractor is an extractor that can point to one or more extractors. When a track is extracted from the file format, all extractors it contains are replaced by the data that they are referencing. If the referenced data also contain extractors, they are also logically replaced by the data that they are referencing, and so on. The value of parameter data_length in the extractor definition can be used as a clue to determine if there are potentially some extractors to recursively solve. The data_length parameter usually gives the number of bytes to copy. Therefore, if the data_length parameter is equal to the size of the referred sample as indicated by the 'stsz' or 'trun' table, extractors present in the referred sample shall be recursively solved. There cannot be any cycle in the extractor paths.

In addition, if only a subset of the complete tiles of a video sequence must be decoded, it may use the tile dependency information in the TileRegionGroupEntry and TileSetGroupEntry sample group descriptions to ignore some extractors while decoding the base track.

As illustrated in FIG. 14, by using recursive extractors, an enhancement layer base track needs to reference only a base layer base track, without explicit reference to base layer tile tracks associated with the base layer base track. In other words, instead of referencing each tile from the base layer explicitly, the enhancement layer only has one base layer extractor per sample. Therefore, a sample of an enhancement layer base track is composed of:
one extractor (extractor 1) pointing to the corresponding sample of the base layer base track (including extractors to base layer tile tracks);
NAL units common for the enhancement layer;
one extractor (extractors 2 to 5) for each enhancement layer tile track; and
optionally, SEI suffix messages.

Compared with a solution based on the use of non-recursive extractors, the use of recursive extractors enables the number of required extractors to be reduced.

For example, when considering a 2×2 tiling at 25 Hz, the bandwidth required for transmitting the extractors of the enhancement layer base track is 12 kbps (5 extractors×12 Bytes×25 Hz×8 bits), leading to 50% saving. Moreover, adding a new layer only slightly increases the encapsulation overhead since only one extractor to the lower layer is needed.

Figure 15:
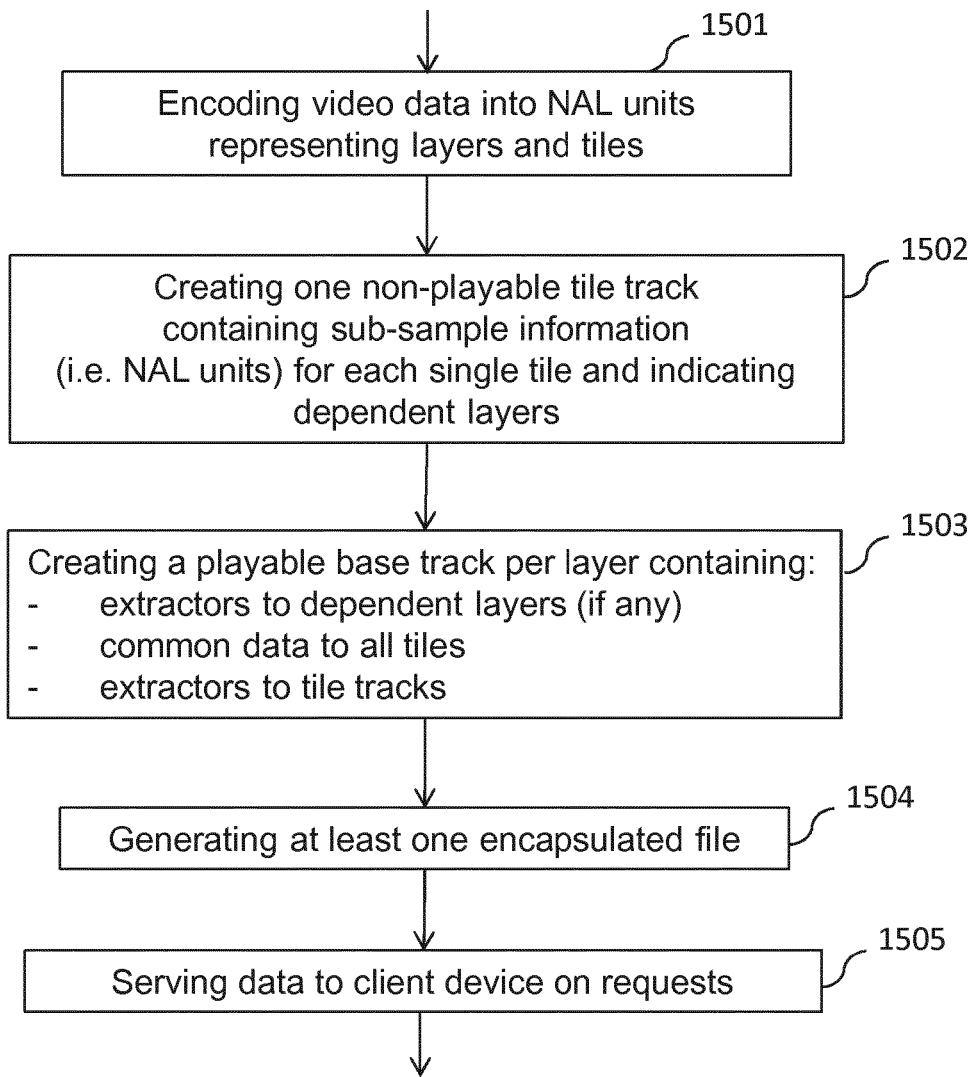
FIG. 15 illustrates an example of steps that can be carried out in a server device for efficiently encapsulating a multi-layer tiled video bit-stream.

FIG. 15 illustrates an example of steps that can be carried out in a server device for efficiently encapsulating a multi-layer tiled video bit-stream.

As illustrated, a first step (step 1501) is directed to encoding a video bit-stream using an encoder providing tiling and scalability features, for example an encoder conforming to the scalable HEVC standard. The encoded bit-stream is composed of NAL units representing layers and/or tiles.

In a following step (step 1502), the server device identifies all the NAL units associated with tiles and creates a tile track containing sub-samples composed of all NAL units corresponding to a given tile in a given layer, for each layer. For instance, the server device may rely on sub-picture level SEI messages to identify the association of NAL units with different picture regions and on sequence-level SEI messages for identifying the position and size of each ROI as it has been proposed to the HEVC standardization committee (proposal JCTVC-K0128). Thus, tubes of tiles can be created for a given layer and periods of time. TileRegionGroupEntry and TileSetGroupEntry sample group description structures can be used to identify tile information and dependencies (as described previously).

Next, the server device creates, for each layer, a base track containing NAL units common to all tiles, recursive extractors on lower level scalability base tracks (if any), and extractors to each of the tile tracks of the current layer (step 1503). Extractors and common NAL units are preferably ordered in such a way that, when extractors are replaced by the data they are referencing, the resulting bit-stream is a valid bit-stream composed of complete video samples ordered in the decoding order.

Next, the server device generates and, preferably, stores segment files containing temporal periods according to the ISO BMF representation (step 1504). Each of the video media tracks (base tracks and tile tracks) are stored in separate segment files. In another embodiment, all media tracks are stored into a single ISO BMF file.

In step 1505, the server device serves, on request, the encapsulated data to the requesting client devices.

In an embodiment, when the encoded data are encapsulated in several segment files, the latter are served to the client device upon requests. In such a case, the server device can be a conventional HTTP server that responds to HTTP requests.

Alternatively, for example for RTP streaming, the server device extracts the bit-stream corresponding to the layer and tiles of the region-of-interest requested by a client device and sends them using, for example, the RTP protocol.

Video bit-stream extraction may occur either at the server end or at the client end.

It typically occurs at the server end when only a video bit-stream is to be sent to a client device, without file format encapsulation. This is the case, in particular, when the server device uses the RTP protocol to push the encoded bit-stream to a client device. In such a case, the server device extracts the video bit-stream from one or several encapsulated ISO BMF files and streams it to the client device using a push protocol such as the RTP protocol.

It occurs at the client end when the video bit-stream is exchanged as ISO BMF file segments. In such a case, the client device downloads the required media segments from a server device using, for instance, HTTP streaming protocol such as DASH. It can use a description of the media representation, previously exchanged with the server device via a manifest, to select only the media segments required to display a user's region-of-interest. The required media segments correspond to the requested spatial or temporal layer, the tiles that cover the user's region-of-interest, and all the base layers and tiles on which they depend. It concatenates the received media segments to build a compliant ISO BMF file from which it can extracts the requested video bit-stream.

Figure 16:
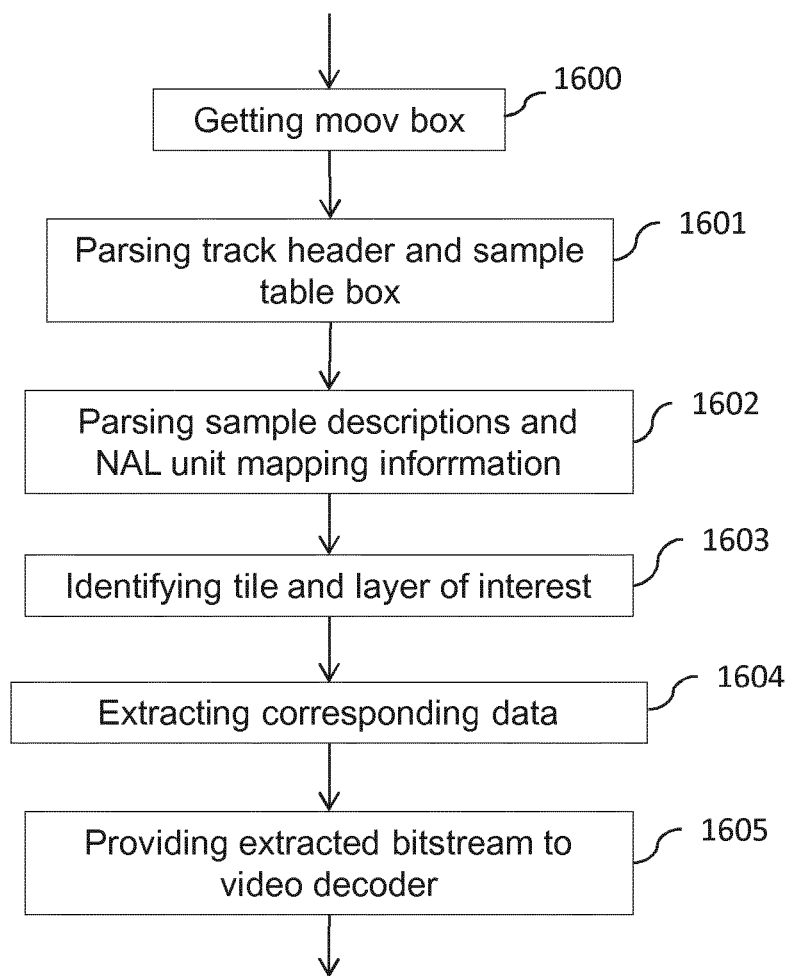
FIG. 16 illustrates an example of steps that can be carried out in a bit-stream reader for de-encapsulating an encoded multi-layer tiled video bit-stream.

FIG. 16 illustrates an example of steps that can be carried out in a bit-stream reader (either in a client device, e.g. a video player, or in a server device, e.g. an RTP server) for de-encapsulating an encoded multi-layer tiled video bit-stream.

In a first step (step 1600), the bit-stream reader reads initialization data, for example initialization data of an encapsulated bit-stream conforming to the MPEG-4 standard, typically the content of a 'moov' box.

Next, in steps 1601 and 1602, the different tracks, samples, and tiles that are available are identified by analyzing track headers, sample tables, and TileRegionGroupEntry and TileSetGroupEntry sample group descriptions.

After having identified the tiles corresponding to the region-of-interest and the layer that fit a request received from a user (step 1603), the data are extracted (step 1604) and provided to a video decoder for being decoded and (typically) displayed (step 1605).

Figure 17:
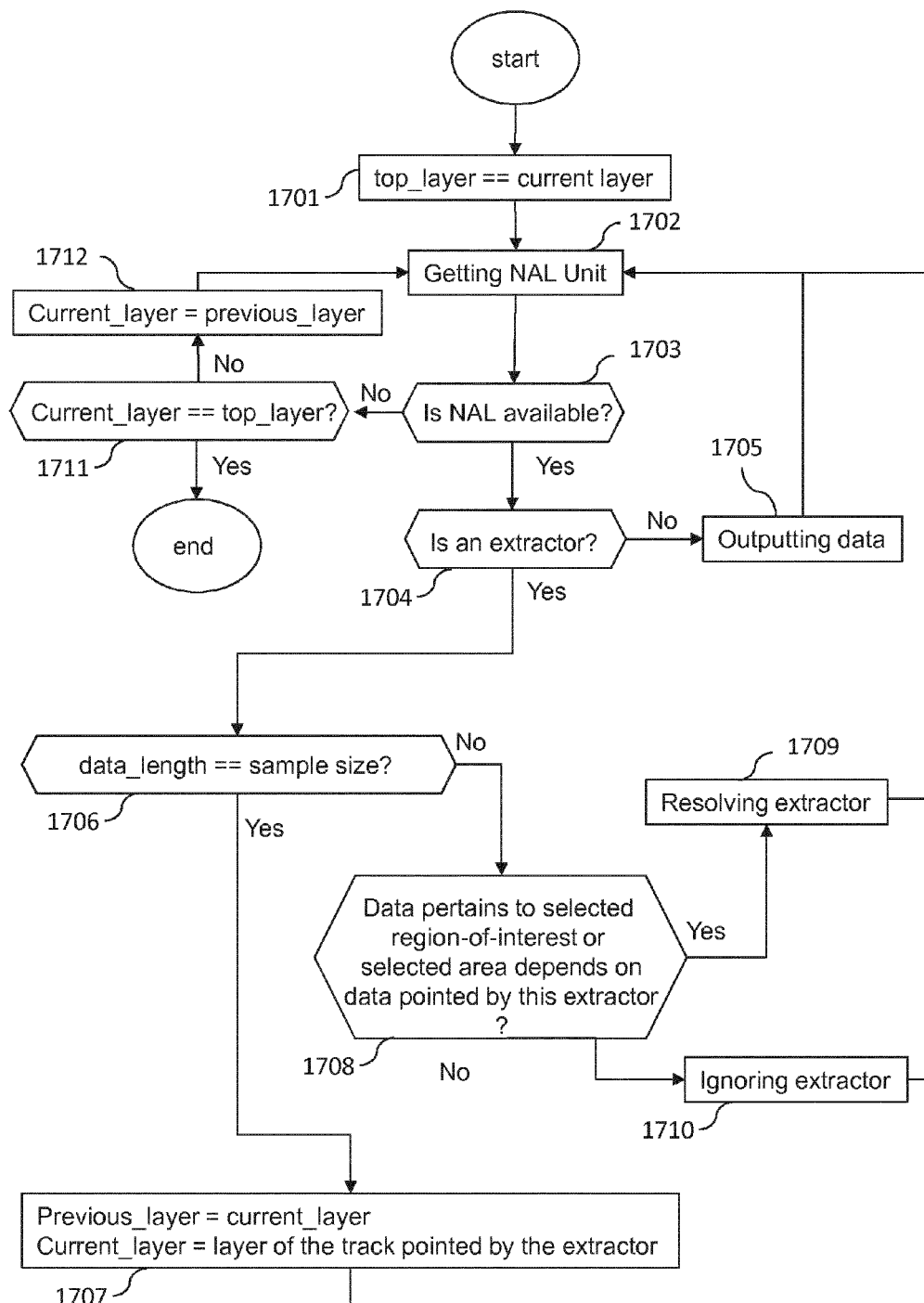
FIG. 17 illustrates an example of an algorithm for extracting video data from a track comprising recursive extractors.

Data can be extracted according to the algorithm illustrated in FIG. 17.

FIG. 17 illustrates an example of an algorithm for extracting video data from a track comprising recursive extractors.

Once the layer to be processed (typically displayed) has been identified in step 1603 (FIG. 16), the bit-stream reader records an identifier of the current layer as an identifier of the top layer (step 1701) and gets the next NAL unit from the base track associated with the requested layer (step 1702). For the sake of illustration, the requested layer can be the enhancement layer base track described by reference to FIG. 14.

A test is then performed to determine whether or not a NAL unit is available (step 1703). If a NAL unit is available, another test is performed to determine whether or not this NAL unit is an extractor (step 1704). If the NAL unit is not an extractor, the data is provided to the decoder (step 1705) and the algorithm is branched to step 1702 to get the next NAL unit (if any).

On the contrary, if the NAL unit is an extractor, another test is performed to determine whether or not the parameter data_length of the extractor is equal to the size of the referenced sample as indicated by the 'stsz' or 'trun' table (step 1706).

If the parameter data_length of the extractor is equal to the size of the referenced sample, extractors present in the referenced sample are recursively solved. To that end, an identifier of the current layer is stored in memory as an identifier of the previous layer and the identifier of the current layer is set as the identifier of the layer of the track pointed to by the extractor (step 1707). Next, the algorithm is branched to step 1702 so as to apply the algorithm illustrated in FIG. 17 to the data pointed to by the extractor.

On the contrary, if the parameter data_length is not equal to the size of the referred sample, another test is performed (step 1708) to determine whether or not the data pointed to by the extractor is pertinent for the region-of-interest selected by the user (e.g. if the extractor points to a tile track, it checks if the coordinates of the tile are located inside the selected area) or if the data pointed to by the extractor is required because other data depends on it (e.g. the extractor points to a tile track that is listed in the dependency list of another tile track currently selected as described in the TileSetGroupEntry sample group description). If one of these conditions is met, the extractor is resolved and replaced by the data pointed to (step 1709). Otherwise, it is ignored (step 1710). Next, the algorithm is branched to step 1702 to get the next NAL unit (if any).

If no NAL unit is available at step 1703, a test is performed to determine whether or not the identifier of the current layer is the identifier of the layer selected at the beginning of the algorithm (top layer). If the current layer is not the layer selected at the beginning of the algorithm, the execution continues with the previous layer (step 1712). On the contrary, if the current layer is the layer selected at the beginning of the algorithm, the algorithm stops.

Figure 18:
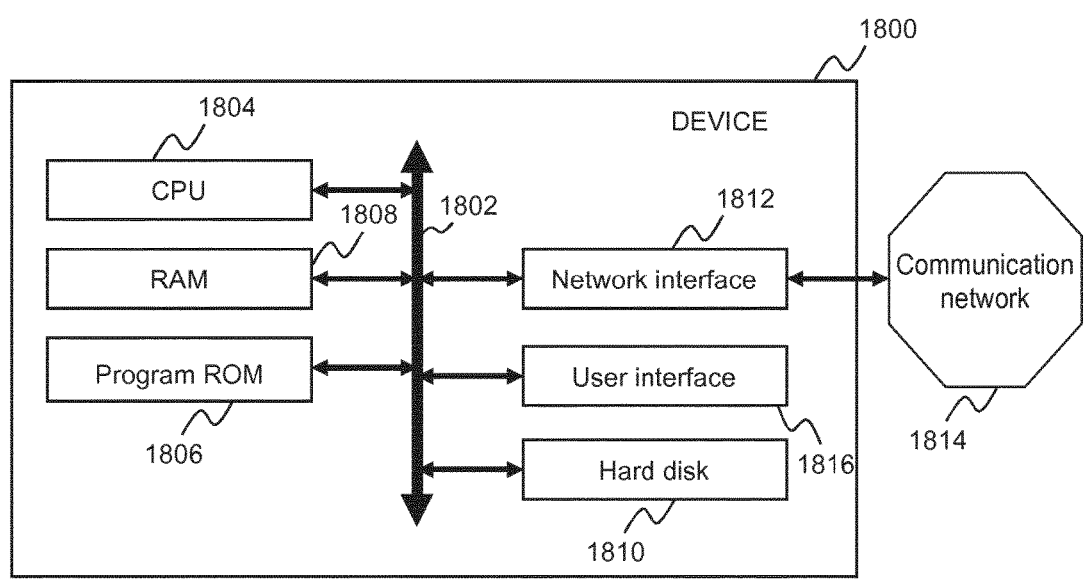
FIG. 18 represents a block diagram of a server or a client device in which steps of one or more embodiments may be implemented.

FIG. 18 represents a block diagram of a server or a client device 1800 in which steps of one or more embodiments may be implemented.

Preferably, the device 1800 comprises a communication bus 1802, a central processing unit (CPU) 1804 capable of executing instructions from program ROM 1806 on powering up of the device, and instructions relating to a software application from main memory 1808 after the powering up. The main memory 1808 is for example of Random Access Memory (RAM) type which functions as a working area of CPU 1804 via the communication bus 1802, and the memory capacity thereof can be expanded by an optional RAM connected to an expansion port (not illustrated). Instructions relating to the software application may be loaded to the main memory 1808 from a hard disk (HD) 1810 or the program ROM 1806 for example. Such software application, when executed by the CPU 1804, causes the steps described with reference to FIGS. 15 to be performed in the server and the steps described with reference to FIGS. 16 and 17 to be performed in the server or in the client device.

Reference numeral 1812 is a network interface that allows the connection of the device 1800 to the communication network 1814. The software application when executed by the CPU 1804 is adapted to react to requests received through the network interface and to provide data streams and requests via the network to other devices.

Reference numeral 1816 represents user interfaces to display information to, and/or receive inputs from, a user.

It should be pointed out here that, as a variant, the device 1800 for managing the reception or sending of multimedia bit-streams can consist of one or more dedicated integrated circuits (ASIC) that are capable of implementing the method as described with reference to FIGS. 15, 16, and 17. These integrated circuits are for example and non-restrictively, integrated into an apparatus for generating or displaying video sequences and/or for listening to audio sequences.

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building placed under surveillance provided that the surveillance camera supports the generation part of this invention.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for encapsulating multi-layer partitioned timed media data, the multi-layer partitioned timed media data comprising timed samples, each timed sample being encoded into a first layer and at least one second layer, at least one timed sample comprising at least one subsample, each subsample being encoded into the first layer or the at least one second layer, the method comprising:

obtaining at least one subsample, belonging to said first layer, from at least one of the timed samples;

creating a first track comprising the at least one obtained subsample;

obtaining at least another subsample, belonging to said second layer, from the same one of the timed samples;

creating a second track comprising said at least another obtained subsample and generating descriptive metadata, the descriptive metadata comprising:

a first descriptor comprising a parameter which indicates, when set to 1, that the at least one obtained subsample belonging to said first layer is a complete frame; and a second descriptor for signaling a dependency link between the at least another obtained subsample belonging to said second layer and the at least one subsample belonging to said first layer, said second descriptor referencing said first descriptor.

2. The method of claim 1, comprising setting said parameter to 1 in said first descriptor when said first layer is a non-tiled layer.

3. The method of claim 1, wherein the first descriptor is a VisualSampleGroupEntry ('trif') descriptor.

4. The method of claim 1, wherein the second descriptor is a VisualSampleGroupEntry ('tsif') descriptor.

5. The method of claim 1, wherein said parameter is a full_frame parameter.

6. The method of claim 2, further comprising, in addition to setting said parameter, setting further parameters of the first descriptor, defining a width and a height of said at least one subsample of said first layer, to the size of the luminance component of said first layer.

7. A method for parsing multi-layer partitioned timed media data, the multi-layer partitioned timed media data comprising:

timed samples, each timed sample being encoded into a first layer and at least one second layer, at least one timed sample comprising at least one subsample, each subsample being encoded into the first layer or the at least one second layer, the media data being encapsulated so as to include a first track comprising at least one subsample, belonging to said first layer, obtained from at least one of the timed samples, and a second track comprising at least another subsample, belonging to said second layer, obtained from the same one of the timed samples, and descriptive metadata, comprising a first descriptor including a parameter which indicates, when set to 1, that the at least one obtained subsample belonging to said first layer is a complete frame and the descriptive metadata further comprising a second descriptor for signaling a dependency link between the at least another obtained subsample belonging to said second layer and the at least one subsample belonging to said first layer, said second descriptor referencing said first descriptor, obtaining the first and second descriptors of the encapsulated media data and employing the obtained first and second descriptors to identify for a desired subsample the or each other subsample on which the desired subsample depends.

8. The method of claim 7, comprising obtaining said parameter from said first descriptor and determining when it is set to 1 that said first layer is a non-tiled layer.

9. The method of claim 7, wherein the first descriptor is a VisualSampleGroupEntry ('trif') descriptor.

10. The method of claim 7, wherein the first descriptor is a VisualSampleGroupEntry ('tsif') descriptor.

11. The method of claim 7, wherein said parameter is a full_frame parameter.

12. The method of claim 8, further comprising, when it is determined that said parameter is set to 1, obtaining further parameters from the first descriptor defining a width and a height of said at least one subsample of said first layer as being equal to the size of the luminance component of said first layer.

13. A non-transitory computer-readable storage medium storing a program which, when executed by a computer or processor, causes the computer or processor to carry out the method of claim 1.

14. A device for encapsulating multi-layer partitioned timed media data, the multi-layer partitioned timed media data comprising timed samples, each timed sample being encoded into a first layer and at least one second layer, at least one timed sample comprising at least one subsample, each subsample being encoded into the first layer or the at least one second layer, the device comprising a microprocessor configured for carrying out the steps of:
    obtaining at least one subsample, belonging to said first layer, from at least one of the timed samples;
    creating a first track comprising the at least one obtained subsample; means for obtaining at least another subsample, belonging to said second layer, from the same one of the timed samples;
    creating a second track comprising said at least another obtained subsample and
    generating descriptive metadata, the descriptive metadata comprising:
        a first descriptor comprising a parameter which indicates, when set to 1, that the at least one obtained subsample belonging to said first layer is a complete frame; and
        a second descriptor for signaling a dependency link between the at least another obtained subsample belonging to said second layer and the at least one subsample belonging to said first layer, said second descriptor referencing said first descriptor.

15. The device of claim 14, wherein the microprocessor is further configured for setting said parameter to 1 in said first descriptor when said first layer is a non-tiled layer.

16. The device of claim 14, wherein the first descriptor is a VisualSampleGroupEntry ('trif') descriptor.

17. The device of claim 14, wherein the second descriptor is a VisualSampleGroupEntry ('tsif') descriptor.

18. The device of claim 14, wherein said parameter is a full_frame parameter.

19. The device of claim 15, wherein the microprocessor is further configured, when setting said parameter to 1, to set further parameters of the first descriptor, defining a width and a height of said at least one subsample of said first layer, to the size of the luminance component of said first layer.

20. A device for parsing encapsulated multi-layer partitioned timed media data, the multi-layer partitioned timed media data comprising timed samples, each timed sample being encoded into a first layer and at least one second layer, at least one timed sample comprising at least one subsample, each subsample being encoded into the first layer or the at least one second layer, and the media data being encapsulated so as to include a first track comprising at least one subsample belonging to said first layer, obtained from at least one of the timed samples, and a second track comprising at least another subsample belonging to said second layer, obtained from the same one of the timed samples, and descriptive metadata comprising a first descriptor including a parameter which indicates, when set to 1, that the at least one obtained subsample belonging to said first layer is a complete frame and the descriptive metadata further comprising a second descriptor for signaling a dependency link between the at least another obtained subsample belonging to said second layer and the at least one subsample belonging to said first layer, said second descriptor referencing said first descriptor, the device comprising a microprocessor configured for carrying out the steps of obtaining the first and second descriptors of the encapsulated media data and of employing the received first and second descriptors to identify, for a desired subsample, the or each other subsample on which the desired subsample depends.

21. The device of claim 20, wherein the microprocessor is further configured for carrying out the steps of obtaining said parameter from said first descriptor and of determining when it is set to 1 that said first layer is a non-tiled layer.

22. The device of claim 20, wherein the first descriptor is a VisualSampleGroupEntry ('trif') descriptor.

23. The device of claim 20, wherein the second descriptor is a VisualSampleGroupEntry ('trif') descriptor.

24. The device of claim 20, wherein said parameter is a full_frame parameter.

25. The device of claim 21, wherein the microprocessor is further configured for carrying out, when said parameter obtained by said obtaining means is 1, a step of obtaining further parameters from the first descriptor defining a width and a height of said at least one subsample of said first layer as being equal to the size of the luminance component of said first layer.

* * * * *